US010812983B2

United States Patent
Yeo et al.

(10) Patent No.: US 10,812,983 B2
(45) Date of Patent: Oct. 20, 2020

(54) TRANSMISSION AND RECEPTION METHOD AND APPARATUS FOR TRANSMITTING SIGNAL USING NARROWBAND IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Yongjun Kwak, Gyeonggi-do (KR); Juho Lee, Gyeonggi-do (KR); Youngbum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/737,636

(22) PCT Filed: Jun. 10, 2016

(86) PCT No.: PCT/KR2016/006174
§ 371 (c)(1),
(2) Date: Dec. 18, 2017

(87) PCT Pub. No.: WO2016/204456
PCT Pub. Date: Dec. 22, 2016

(65) Prior Publication Data
US 2018/0176788 A1 Jun. 21, 2018

(30) Foreign Application Priority Data
Jun. 17, 2015 (KR) .................. 10-2015-0086128

(51) Int. Cl.
| | |
|---|---|
| *H04W 16/14* | (2009.01) |
| *H04L 5/00* | (2006.01) |
| *H04L 27/26* | (2006.01) |
| *H04W 8/24* | (2009.01) |
| *H04W 28/26* | (2009.01) |
| *H04W 72/04* | (2009.01) |

(52) U.S. Cl.
CPC ........... *H04W 16/14* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS

| | | |
|---|---|---|
| 8,090,037 B1 | 1/2012 | Harris et al. |
| 2010/0027502 A1 | 2/2010 | Chen et al. |

(Continued)

FOREIGN PATENT DOCUMENTS

| | | |
|---|---|---|
| CN | 102754385 | 10/2012 |
| JP | 2014168249 | 9/2014 |

(Continued)

OTHER PUBLICATIONS

European Search Report dated Apr. 17, 2018 issued in counterpart application No. 16811869.3-1219, 13 pages.

(Continued)

*Primary Examiner* — Anh Ngoc M Nguyen
(74) *Attorney, Agent, or Firm* — The Farrell Law Firm, P.C.

(57) ABSTRACT

Provided are a communication method and system that combine IoT technologies with 5G communication systems supporting a higher data rate after 4G systems. The present disclosure may be applied to intelligent services, such as smart homes, smart buildings, smart cities, smart or connected cars, healthcare, digital education, retail businesses, and security and safety related services on the basis of 5G communication technologies and IoT related technologies. The present invention relates to a wireless communication system, and more particularly, to a method and apparatus for transmitting uplink and downlink signals in a system sup- (Continued)

porting IoT terminals that perform transmission and reception using only one subcarrier. Specifically, there is provided a method including: allocating a resource for an IoT terminal; and exchanging a signal through a specific subcarrier of the resource between the IoT terminal and the base station supporting the IoT terminal.

24 Claims, 26 Drawing Sheets

(52) U.S. Cl.
CPC .......... *H04L 5/0055* (2013.01); *H04L 5/0094* (2013.01); *H04L 27/263* (2013.01); *H04L 27/265* (2013.01); *H04L 27/2691* (2013.01); *H04W 8/24* (2013.01); *H04W 28/26* (2013.01); *H04W 72/0406* (2013.01); *H04L 5/0007* (2013.01)

(56) References Cited

U.S. PATENT DOCUMENTS

| | | |
|---|---|---|
| 2010/0226264 A1 | 9/2010 | Axmon et al. |
| 2011/0194510 A1 | 8/2011 | Gaal et al. |
| 2012/0003941 A1 | 1/2012 | Xiao et al. |
| 2013/0064119 A1 | 3/2013 | Montojo et al. |
| 2013/0077582 A1 | 3/2013 | Kim et al. |
| 2014/0098781 A1 | 4/2014 | Vos et al. |
| 2014/0133387 A1 | 5/2014 | Wagner et al. |
| 2015/0181577 A1* | 6/2015 | Moulsley .............. H04L 5/0053 370/329 |
| 2016/0174227 A1 | 6/2016 | Martin et al. |
| 2016/0183044 A1* | 6/2016 | Wei .......................... H04W 4/02 455/456.1 |
| 2017/0223725 A1* | 8/2017 | Xiong ................... H04L 5/0053 |

FOREIGN PATENT DOCUMENTS

| | | |
|---|---|---|
| KR | 1020110134464 | 12/2011 |
| KR | 1020130032548 | 4/2013 |
| KR | 1020140062149 | 5/2014 |
| KR | 1020150024926 | 3/2015 |
| KR | 101521616 | 5/2015 |
| WO | WO 2015/022091 | 2/2015 |

OTHER PUBLICATIONS

Chinese Office Action dated May 22, 2020 issued in counterpart application No. 201680035231.3, 18 pages.

* cited by examiner

TRANSMISSION AND RECEPTION METHOD AND APPARATUS FOR TRANSMITTING SIGNAL USING NARROWBAND IN WIRELESS CELLULAR COMMUNICATION SYSTEM

PRIORITY

This application is a National Phase Entry of PCT International Application No. PCT/KR2016/006174 which was filed on Jun. 10, 2016, and claims priority to Korean Patent Application No. 10-2015-0086128, which was filed on Jun. 17, 2015, the content of each of which is incorporated herein by reference.

TECHNICAL FIELD

The present invention relates to a wireless communication system, and more particularly, to a method and system for transmitting and receiving data for narrowband transmission using one subcarrier.

BACKGROUND ART

Since commercial deployment of 4G communication systems, to meet the ever increasing demand for wireless data traffic, efforts have been made to develop improved 5G or pre-5G communication systems. As such, 5G or pre-5G communication systems are also called "beyond 4G network" or "post LTE system". To achieve higher data rates, 5G communication systems consider utilization of the mmWave band (e.g. 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing described above may be an instance of convergence of 5G communication technology and IoT technology.

As LTE network operators wish to support IoT equipments with minimal additional cost, there is a need for a transmission and reception technique that supports low-cost and low-power IoT equipments while minimizing changes in existing LTE base stations and not causing interference to existing LTE terminals.

DISCLOSURE OF INVENTION

Technical Problem

Therefore, it is necessary to derive and define a signal transmission and reception method for the LTE or LTE-A system supporting IoT terminals and a signal transmission and reception method for an IoT terminal. It is also necessary to define the structure of frequency and time resources for the LTE or LTE-A system supporting IoT terminals. Accordingly, to solve the above problem, an aspect of the present invention is to provide a transmission and reception method and apparatus for an IoT terminal and base station supporting the IoT terminal in an LTE or LTE-A system capable of operating low-power and low-cost IoT terminals.

Solution to Problem

In accordance with an aspect of the present invention, there is provided a method for a base station to transmit and receive signals in a wireless communication system. The method may include: determining whether the terminal to be scheduled is an IoT terminal (first type terminal) or a normal LTE terminal (second type terminal); generating, if the terminal to be scheduled is a first type terminal, control and data information for the first type terminal; and transmitting the generated control and data information. Here, the frequency resource allocated to the first type terminal is one subcarrier per first type terminal and is narrowband compared with a resource block (RB) allocatable to the second type terminal.

In accordance with another aspect of the present invention, the method for an IoT terminal to transmit and receive signals in a wireless communication system does not use FFT/IFFT processing and performs filtering using suitable filter coefficients.

In accordance with another aspect of the present invention, there is provided a method for a base station to transmit and receive signals to and from a second terminal. The method may include: configuring a resource block (RB) to be used by the second terminal; allocating at least one subcarrier of the resource block to be used by the second terminal to the second terminal; and transmitting and receiving at least one of data, a pilot signal, and control information to and from the second terminal by use of the at least one subcarrier.

In accordance with another aspect of the present invention, there is provided a method for a second terminal to transmit and receive signals to and from a base station. The method may include: identifying a resource block (RB) to be used by the second terminal; identifying at least one subcarrier of the resource block to be used by the second terminal; and transmitting and receiving at least one of data, a pilot signal, and control information to and from the base station by use of the at least one subcarrier.

In accordance with another aspect of the present invention, there is provided a second terminal capable of transmitting and receiving signals to and from a base station. The second terminal may include: a transceiver to transmit and receive a signal to and from the base station; and a controller to control performing analog-to-digital conversion of a signal received through the transceiver, removing a cyclic prefix (CP), filtering through a filter corresponding to a subcarrier allocated to the second terminal, and performing detection.

In accordance with another aspect of the present invention, there is provided a second terminal capable of transmitting and receiving signals to and from a base station. The second terminal may include: a transceiver to transmit and receive a signal to and from the base station; and a controller to control filtering data to be transmitted to the base station through a filter corresponding to a subcarrier allocated to the second terminal, inserting a cyclic prefix (CP) into a signal containing the filtered data, and performing digital-to-analog conversion of the signal.

Advantageous Effects of Invention

In a feature of the present invention, there is provided a transmission and reception method using only one subcarrier, enabling legacy terminals and IoT terminals to efficiently coexist in the system.

MODE FOR THE INVENTION

In contrast to early wireless communication systems having provided voice-oriented services only, advanced broadband wireless communication systems, such as 3GPP high speed packet access (HSPA) systems, long term evolution (LTE) or evolved universal terrestrial radio access (E-UTRA) systems, 3GPP2 high rate packet data (HRPD) systems, ultra mobile broadband (UMB) systems, and IEEE 802.16e based systems, may provide high-speed and high-quality packet data services. In the following description, LTE and LTE-A may be used interchangeably.

In the LTE system as a representative example of a wideband wireless communication system, orthogonal frequency division multiplexing (OFDM) is used for the downlink (DL) and single carrier frequency division multiple access (SC-FDMA) is used for the uplink (UL). The uplink refers to a radio link through which a terminal (user equipment (UE) or mobile station (MS)) transmits a data or control signal to a base station (BS or eNode B), and the downlink refers to a radio link through which a base station transmits a data or control signal to a terminal. In such multiple access schemes, time-frequency resources used to carry user data or control information are allocated so as not to overlap each other (i.e. maintain orthogonality) to thereby identify the data or control information of a specific user.

The LTE system employs hybrid automatic repeat request (HARQ) to retransmit data at the physical layer when a decoding error has occurred in the initial transmission. HARQ is a scheme that enables the receiver having failed in decoding data to transmit information (negative acknowledgement (NACK)) indicating the decoding failure to the transmitter so that the transmitter can retransmit the corresponding data at the physical layer. The receiver may combine the retransmitted data with the previously received data for which decoding has failed, increasing data reception performance. When the data is correctly decoded, the receiver may transmit information (acknowledgement (ACK)) indicating successful decoding to the transmitter so that the transmitter can transmit new data.

Figure 1:
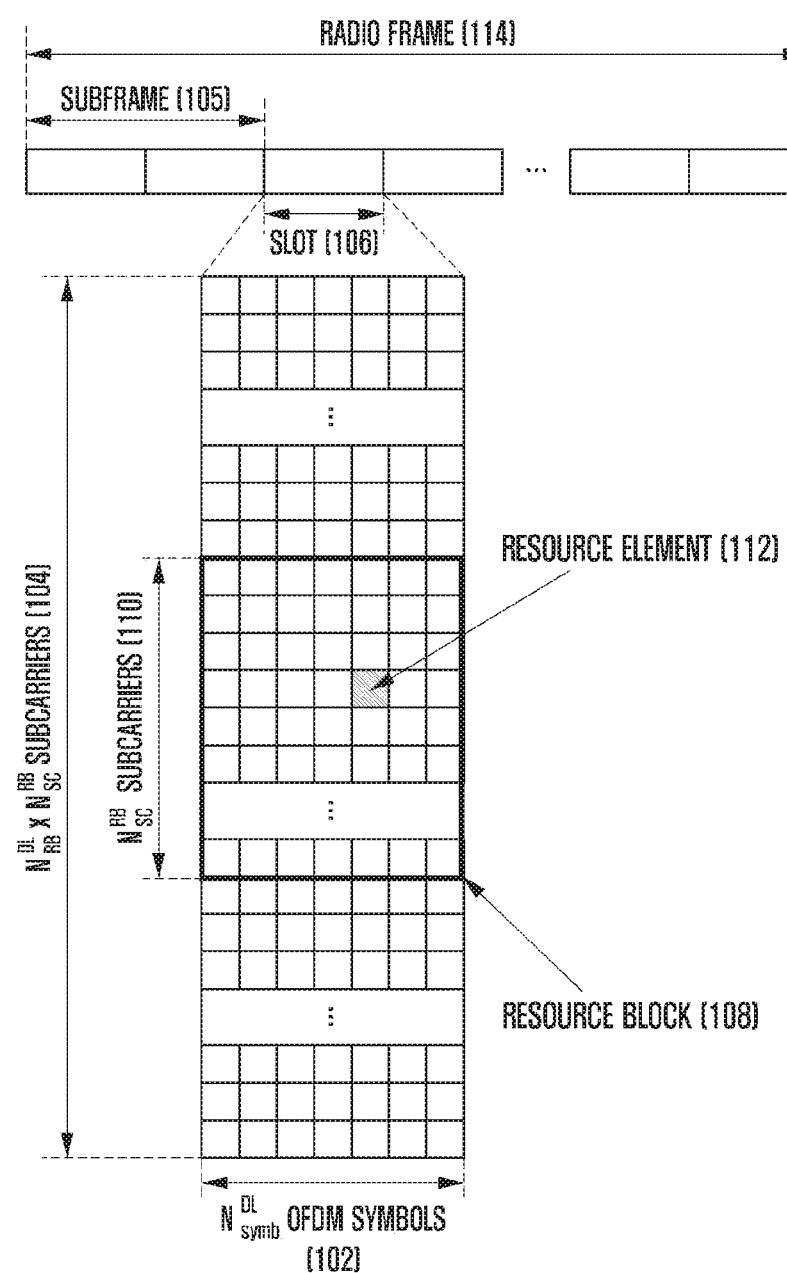
FIG. 1 illustrates the basic structure of the time-frequency domain serving as radio resources to transmit data or control channels in the downlink of the LTE system.

FIG. 1 illustrates the basic structure of the time-frequency domain serving as radio resources to transmit data or control channels in the downlink of the LTE system.

In FIG. 1, the horizontal axis denotes the time domain and the vertical axis denotes the frequency domain. In the time domain, the minimum unit for transmission is OFDMA symbols, $N_{symb}^{DL}$ OFDMA symbols 102 constitute one slot 106, and two slots constitute one subframe 105. The length of a slot is 0.5 ms and the length of a subframe is 1.0 ms. The radio frame (or frame) 114 is a time domain unit composed of 10 subframes. In the frequency domain, the minimum unit for transmission is subcarriers, and the total system transmission bandwidth is composed of total $N_{RB}^{DL} \times N_{sc}^{RB}$ subcarriers 104.

The basic unit of resources in the time-frequency domain is a resource element (RE) 112. The RE may be represented by an OFDM symbol index and a subcarrier index. A resource block (RB, or physical resource block (PRB)) 108 is defined by $N_{symb}^{DL}$ consecutive OFDM symbols 102 in the time domain and $N_{sc}^{RB}$ consecutive subcarriers 110 in the frequency domain. Hence, one RB 108 is composed of $N_{symb}^{DL} \times N_{sc}^{RB}$ REs 112. In general, the minimum unit for data transmission is a resource block. Normally, in the LTE system, $N_{symb}^{DL}$ is set to 7 and $N_{sc}^{RB}$ is set to 12, and the number of subcarriers $N_{BW}$ or $N_{RB}^{DL}$ in the system transmission bandwidth are proportional to the bandwidth of the system transmission band. The data rate may increase in proportion to the number of resource blocks scheduled for the terminal. The LTE system defines and operates six transmission bandwidths. In the case of an FDD system where downlink and uplink frequencies are separately used, the downlink transmission bandwidth may differ from the uplink transmission bandwidth. The channel bandwidth denotes an RF bandwidth corresponding to the system transmission bandwidth.

Table 1 illustrates a correspondence between the system transmission bandwidth and the channel bandwidth defined in the LTE system. For example, the transmission bandwidth of an LTE system having a channel bandwidth of 10 MHz is composed of 50 resource blocks.

TABLE 1

| Channel bandwidth $BW_{Channel}$[MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

In a subframe, N initial OFDM symbols are used to transmit downlink control information. In general, N={1, 2, 3}. The value of N varies for each subframe according to the amount of control information to be transmitted at the current subframe. The control information may include a control channel transmission interval indicator indicating the number of OFDM symbols carrying control information, scheduling information for downlink data or uplink data, and HARQ ACK/NACK signals.

In the LTE system, scheduling information for downlink data or uplink data is transmitted by the base station to the terminal through downlink control information (DCI). Various DCI formats are defined. The DCI format to be used may be determined according to various parameters related to scheduling information for uplink data (UL grant), scheduling information for downlink data (DL grant), compact DCI with a small size, spatial multiplexing using multiple antennas, and power control DCI. For example, DCI format 1 for scheduling information of downlink data (DL grant) is configured to include at least the following pieces of control information.

Resource allocation type 0/1 flag: this indicates whether the resource allocation scheme is of type 0 or type 1. Type 0 indicates resource allocation in units of Resource Block Group (RBG) by use of a bitmap. In the LTE system, the basic scheduling unit is a resource block (RB) represented as a time-frequency domain resource. An RBG including multiple RBs is the basic scheduling unit for type 0. Type 1 indicates allocation of a specific RB in one RBG.

Resource block assignment: this indicates an RB allocated for data transmission. The resource represented by resource block assignment is determined according to the system bandwidth and resource allocation scheme.

Modulation and coding scheme (MCS): this indicates the modulation scheme applied for data transmission and the transport block (TB) size for data to be transmitted.

HARQ process number: this indicates the process number of the corresponding HARQ process.

New data indicator: this indicates either initial transmission for HARQ or retransmission.

Redundancy version: this indicates the redundancy version for HARQ.

TPC (transmit power control) command for PUCCH: this indicates a TPC command for the physical uplink control channel (PUCCH) being an uplink control channel.

The DCI is channel coded, modulated, and transmitted through the physical downlink control channel (PDCCH or control information) or EPDCCH (enhanced PDCCH or enhanced control information).

In general, for each terminal, the DCI is scrambled with a specific radio network temporary identifier (RNTI, or terminal ID), appended by a cyclic redundancy check (CRC) value, channel coded, and transmitted via an independent PDCCH. In the time domain, the PDCCH is mapped and transmitted during the control channel transmission interval. In the frequency domain, the mapping position of the PDCCH is determined by the identifier (ID) of each terminal and the PDCCH is dispersed across the overall system transmission bandwidth.

Downlink data is transmitted via the physical downlink shared channel (PDSCH) serving as a shared physical downlink data channel. The PDSCH is transmitted after the control channel transmission interval. Scheduling information for the PDSCH such as mapping positions in the frequency domain or the modulation scheme is notified by the DCI transmitted on the PDCCH.

The base station uses the 5-bit MCS field of control information constituting the DCI to notify the UE of the modulation scheme applied to the PDSCH (to be transmitted to UE) and the size of data to be transmitted (transport block size (TBS)). The TBS indicates the size of a transport block (TB) before channel coding is applied for error correction.

Modulation schemes supported by the LTE system include QPSK (quadrature phase shift keying), 16QAM (quadrature amplitude modulation), and 64QAM, whose modulation order (Qm) is 2, 4 and 6, respectively. That is, it is possible to transmit 2, 4, and 6 bits per symbol by using QPSK, 16QAM, and 64QAM, respectively.

Figure 2:
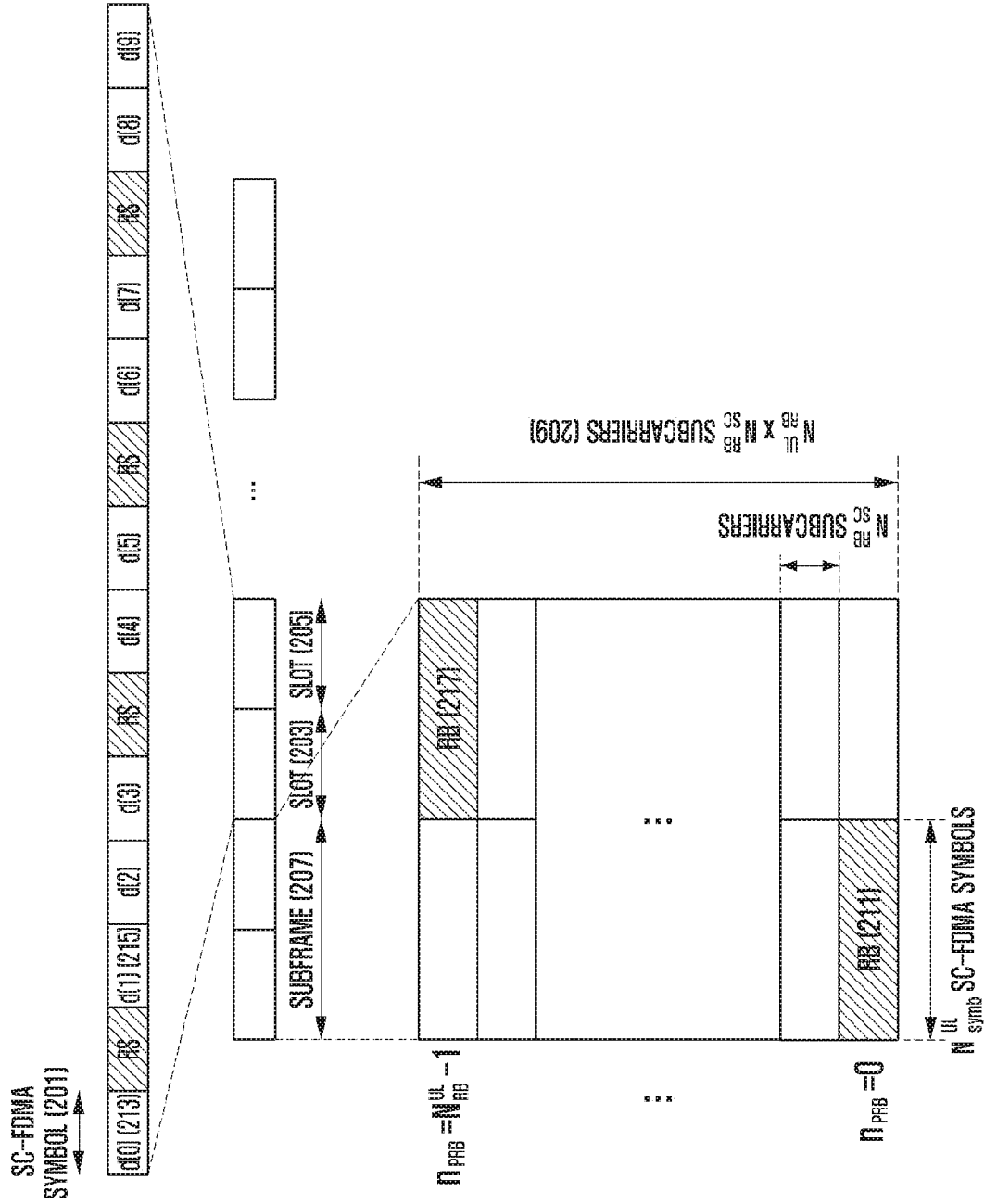
FIG. 2 illustrates the structure of the time-frequency domain of the PUCCH in the LTE-A system according to the related art.

FIG. 2 illustrates the structure of the time-frequency domain of the PUCCH in the LTE-A system according to the related art. In other words, FIG. 2 illustrates a time-frequency domain structure of PUCCH transmission in the LTE-A system where the PUCCH is a physical layer control channel through which the UE transmits uplink control information (UCI) to the base station.

In FIG. 2, the horizontal axis denotes the time domain and the vertical axis denotes the frequency domain. In the time domain, the minimum unit for transmission is SC-FDMA symbols 201, $N_{symb}^{UL}$ SC-FDMA symbols constitute one slot 203 or 205, and two slots constitute one subframe 207. In the frequency domain, the minimum unit for transmission is subcarriers, and the total system transmission bandwidth 209 is composed of total $N_{BB}$ or $N_{RB}^{UL} \times N_{sc}^{RB}$ subcarriers. The value of $N_{BW}$ is proportional to the system transmission bandwidth.

The basic unit of resources in the time-frequency domain is a resource element (RE). The RE may be represented by an SC-FDMA symbol index and a subcarrier index. A resource block (RB) 211 or 217 is defined by $N_{symb}^{UL}$ consecutive SC-FDMA symbols in the time domain and $N_{sc}^{RB}$ consecutive subcarriers in the frequency domain. Hence, one RB is composed of $N_{symb}^{UL} \times N_{sc}^{RB}$ REs. In general, the minimum unit for transmitting data or control information is a resource block. The PUCCH is mapped to one RB in the frequency domain and transmitted for one subframe.

Specifically, FIG. 2 illustrates a case where $N_{symb}^{UL}=7$, $N_{sc}^{RB}=12$, and $N_{RS}^{PUCCH}=2$ (the number of reference signals (RS) in one slot for channel estimation). Reference signals (RS) are generated using constant amplitude zero auto-correlation (CAZAC) sequences. CAZAC sequences have a constant amplitude and have an autocorrelation of zero. When a given CAZAC sequence is cyclically shifted (CS) by a value greater than the delay spread of the propagation path to produce a new CAZAC sequence, the original CAZAC sequence and the new CAZAC sequence are orthogonal. Hence, a CAZAC sequence of length L may be used to generate up to L cyclically-shifted orthogonal CAZAC sequences. The length of a CAZAC sequence applied to the PUCCH is 12 (the number of subcarriers constituting one RB).

The UCI is mapped to a SC-FDMA symbol to which an RS is not mapped. The UCI may include at least one of the following pieces of control information.

HARQ-ACK: when no error is found in downlink data received from the base station through the PDSCH (serving as a downlink data channel) to which HARQ (hybrid automatic repeat request) is applied, the UE feedbacks ACK; and when an error is found therein, the UE feedbacks NACK.

Channel Status Information (CSI): this includes a channel quality indicator (CQI), precoding matrix indicator (PMI), rank indicator (RI), or signal carrying downlink channel coefficients. To achieve a desired level of data reception performance, the base station may set the modulation and coding scheme (MCS) for data to be transmitted to the UE to a suitable value on the basis of CSI information obtained from the UE. The CQI indicates the signal to interference and noise ratio (SINR) for the full system bandwidth (wideband) or a part thereof (subband) and is normally represented as an MCS value indicating a specific level of data reception performance. The PMI/RI indicates precoding and rank information needed by the BS to transmit data through multiple antennas in a system supporting multiple input multiple output (MIMO). The signal carrying downlink channel coefficients may provide more detailed channel status information compared with the CSI signal, but with increased uplink overhead. Here, the UE is notified in advance, through higher layer signaling, by the BS of CSI configuration information, such as reporting mode indicating specific information items to be fed back, resource information indicating resources to be used, and transmission period. The UE transmits CSI information to the BS by use of the CSI configuration information received in advance.

FIG. 2 shows a case where total 10 UCI modulation symbols d(0), d(1), . . . , d(9) (213 and 215) are mapped respectively to SC-FDMA symbols in one subframe. To multiplex UCI information of different UEs, each UCI modulation symbol is multiplied by a CAZAC sequence cyclically-shifted by a given value and mapped to the corresponding SC-FDMA symbol. To achieve frequency diversity, frequency hopping is applied to the PUCCH on a slot basis. The PUCCH is placed at an outer portion of the system transmission bandwidth so that the remaining portion thereof may be used for data transmission. For example, in the first slot of a subframe, the PUCCH is mapped to RB 211 disposed at an outermost portion of the system transmission bandwidth. In the second slot, the PUCCH is mapped to RB 217 disposed at another outermost portion of the system transmission bandwidth, where the frequency for RB 217 is different from that for RB 211. The PUCCH can be mapped to any RB by the base station, but is generally mapped to an RB located at an outer portion.

In the LTE system, for the PDSCH (physical layer channel for downlink data transmission) or the PDCCH/EPDDCH containing semi-persistent scheduling (SPS) release, the timing of the PUCCH or PUSCH (uplink physical layer channel transmitting HARQ ACK/NACK) may be fixed. For example, in the LTE system operating in frequency division duplex (FDD) mode, for the PDSCH or PDCCH/EPDCCH containing SPS release transmitted at n-4$^{th}$ subframe, HARQ ACK/NACK is transmitted through the PUCCH or PUSCH at n$^{th}$ subframe.

The LTE system adopts an asynchronous HARQ scheme where the data retransmission timing is not fixed in the downlink. That is, when HARQ NACK is fed back by the UE in response to the initial data transmission from the BS, the BS may determine the retransmission timing freely according to the scheduling operation. For HARQ operation, the UE buffers the data causing a decoding error and combines the buffered data with the next retransmission data.

The LTE system adopts a synchronous HARQ scheme having fixed data transmission points in the uplink unlike downlink HARQ. That is, the uplink/downlink timing relationship among Physical Uplink Shared Channel (PUSCH), Physical Downlink Control Channel (PDCCH) followed by the PUSCH, and Physical Hybrid Indicator Channel (PHICH) carrying downlink HARQ ACK/NACK corresponding to the PUSCH are fixed according to the following rules.

If the PDCCH carrying uplink scheduling control information or the PHICH carrying downlink HARQ ACK/NACK is received from the BS at $n^{th}$ subframe, the UE transmits the PUSCH carrying uplink data corresponding to the control information at $n+k^{th}$ subframe. Here, the value of k is specified differently for the FDD or TDD (time division duplex) mode and its configurations. For example, k is fixed to 4 for the FDD LTE system, and k varies according to the UL-DL subframe configuration for the TDD LTE system.

If the PHICH carrying downlink HARQ ACK/NACK is received from the BS at $i^{th}$ subframe, the PHICH corresponds to the PUSCH having been transmitted by the UE at $i-k^{th}$ subframe. Here, the value of k is specified differently for the FDD or TDD mode and its configurations. For example, k is fixed to 4 for the FDD LTE system.

Meanwhile, in recent years, along with the above-described broadband wireless communication system that provides high-speed and high-quality packet data services, there is a need for a communication system using communication modules that are inexpensive and consume very little power to provide Internet-of-Things (IOT) services. Specifically, such a communication module is required to have a low price of 1 to 2 dollars and to consume low power so that it can operate for about 10 years with one AA-size battery. In addition, the IoT communication module needs to have a wider coverage than current cellular communication so that it can be used for water, electricity, and gas metering. The GERAN technical specification group of 3GPP is working on the standardization of cellular-based IoT services using existing GSM frequency channels, and the RAN technical specification group is working on the standardization of machine type communication (MTC) terminals operating based on LTE. Both of these technologies support low cost communication module implementations and support a wide range of coverage. However, LTE-based MTC terminals are still not cheap enough and their battery life is not long enough. It is expected that a new transmission and reception technique will be needed for a terminal that provides a cellular-based IoT service (referred to as an IoT terminal).

In particular, as LTE network operators wish to support IoT equipments with minimal additional cost, there is a need for a transmission and reception technique that supports low-cost and low-power IoT equipments while minimizing changes in existing LTE base stations and not causing interference to existing LTE terminals. Accordingly, the present invention proposes a concrete method and apparatus for supporting a low-cost and low-power IoT equipment without significantly changing the general LTE base station hardware.

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the present invention in the best manner. Accordingly, the meaning of specific terms or words used in the specification and the claims should be construed in accordance with the spirit of the present invention. In the following description, the term "base station" refers to a main agent allocating resources to UEs and may be at least one of eNode B, Node B, BS, radio access unit, base station controller, and network node. The term "user equipment (UE)" may refer to at least one of mobile station (MS), cellular phone, smartphone, computer, and multimedia system with a communication function. The term "downlink (DL)" refers to a wireless transmission path through which the BS transmits a signal to the UE, and the term "uplink (UL)" refers to a wireless transmission path through which the UE transmits a signal to the BS. The following description of embodiments is focused on the LTE or LTE-A system. However, it should be understood by those skilled in the art that the subject matter of the present invention is applicable to other communication systems having similar technical backgrounds and channel configurations without significant modifications departing from the scope of the present invention.

In the following description, the IoT terminal may be referred to as a first type terminal, and the legacy LTE or LTE-A terminal may be referred to as a second type terminal. The first type terminal may be a terminal transmitting and receiving using only one subcarrier, and the second type terminal may be a terminal transmitting and receiving in units of resource blocks (RB) including 12 subcarriers. In the following description, the terms "IoT terminal" and "first type terminal" may be used interchangeably, and the terms "normal terminal", "conventional terminal", "LTE terminal", and "second type terminal" may be used interchangeably. The terms "subcarrier" and "tone" may be used interchangeably. In the present invention, the IoT terminal can be referred to as NB-LTE, NB-IoT, LTE-Lite, and LTE-M.

As described above, the present invention defines transmission and reception operations for the IoT terminal and base station, and proposes a detailed method that enables a legacy terminal and an IoT terminal to operate together in the same system. In the present invention, a normal terminal refers to a terminal that transmits and receives control and data information in units of minimum RBs. The control information for the normal UE is transmitted through a PDCCH mapped to up to 3 OFDM symbols of the entire system frequencies in one subframe or through an EPDCCH mapped to a specific resource block in one subframe. The IoT terminal refers to a terminal that can transmit and receive in units of minimum RBs like a normal terminal or transmit and receive using only one subcarrier. The IoT terminal may also refer to a terminal that can transmit and receive using only one subcarrier.

One aspect of the present invention is to provide a transmission and reception method for an IoT terminal that transmits and receives using one subcarrier in the uplink and the downlink. More specifically, one subcarrier is allocated to a specific IoT terminal, and there is provided an operation method that enables the base station and the IoT terminal to transmit data using the allocated subcarrier. A description is given of a basic structure of the time-frequency domain in the LTE system with reference to FIG. 3.

The downlink frame and the uplink frame are commonly composed of subframes having a length of 1 ms or slots having a length of 0.5 ms in the time domain, and are respectively composed of $N_{RB}^{DL}$ RBs and $N_{RB}^{UL}$ RBs in the frequency domain. For data transmission in the downlink and uplink, frequency allocation for each terminal is performed on a per RB basis. One RB is composed of 12 subcarriers in the frequency domain.

Figure 3:
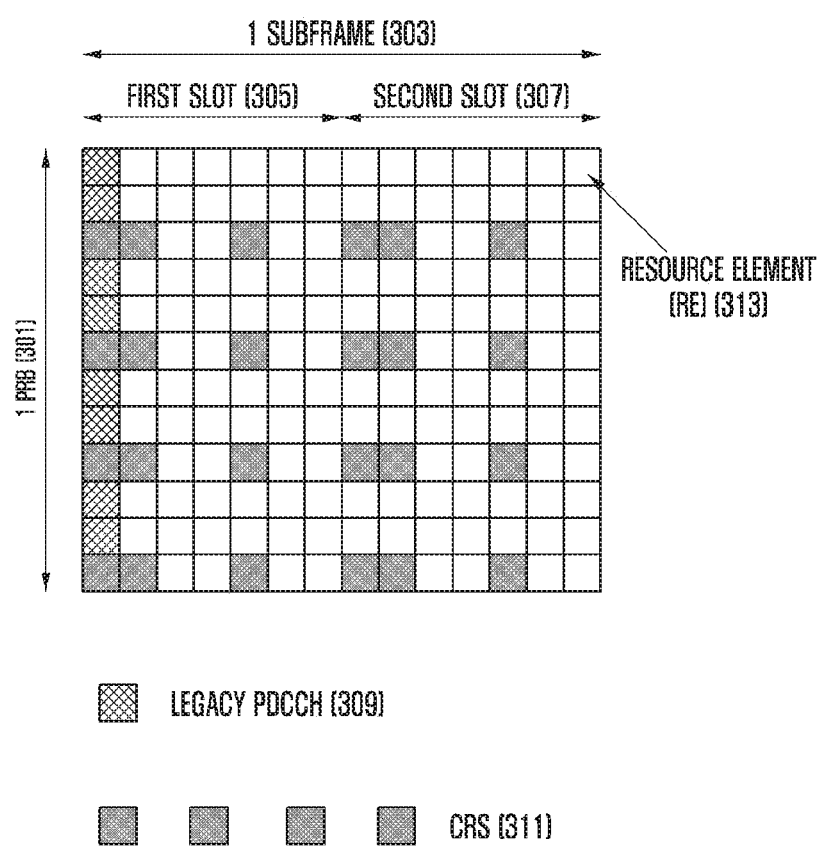
FIG. 3 shows one PRB pair in the time-frequency domain serving as radio resources to transmit data or control channels in the downlink of the LTE system.

FIG. 3 shows one PRB pair in the time-frequency domain serving as radio resources to transmit data or control channels in the downlink of the LTE system.

In FIG. 3, the horizontal axis denotes the time domain and the vertical axis denotes the frequency domain. The transmission time interval (TTI) of the LTE system corresponds to one subframe (303) of 1 ms. One subframe is composed of two slots 305 and 307, and each slot includes 7 OFDM symbols. In the frequency domain, one PRB 301 includes a set of 12 consecutive subcarriers. One RE 313 is defined by one OFDM symbol and one subcarrier and is a unit to which data symbols are mapped in the LTE system. In one PRB pair of one subframe, 24 REs are used to transmit a cell-specific reference signal (CRS). In one subframe, there are a total of 14 OFDM symbols, of which 1, 2 or 3 OFDM symbols are assigned for PDCCH transmission. FIG. 3 shows an example in which one OFDM symbol is used for PDCCH transmission. That is, in the LTE system, up to the first three OFDM symbols of a subframe are generally used for downlink control channel transmission.

Figure 4:
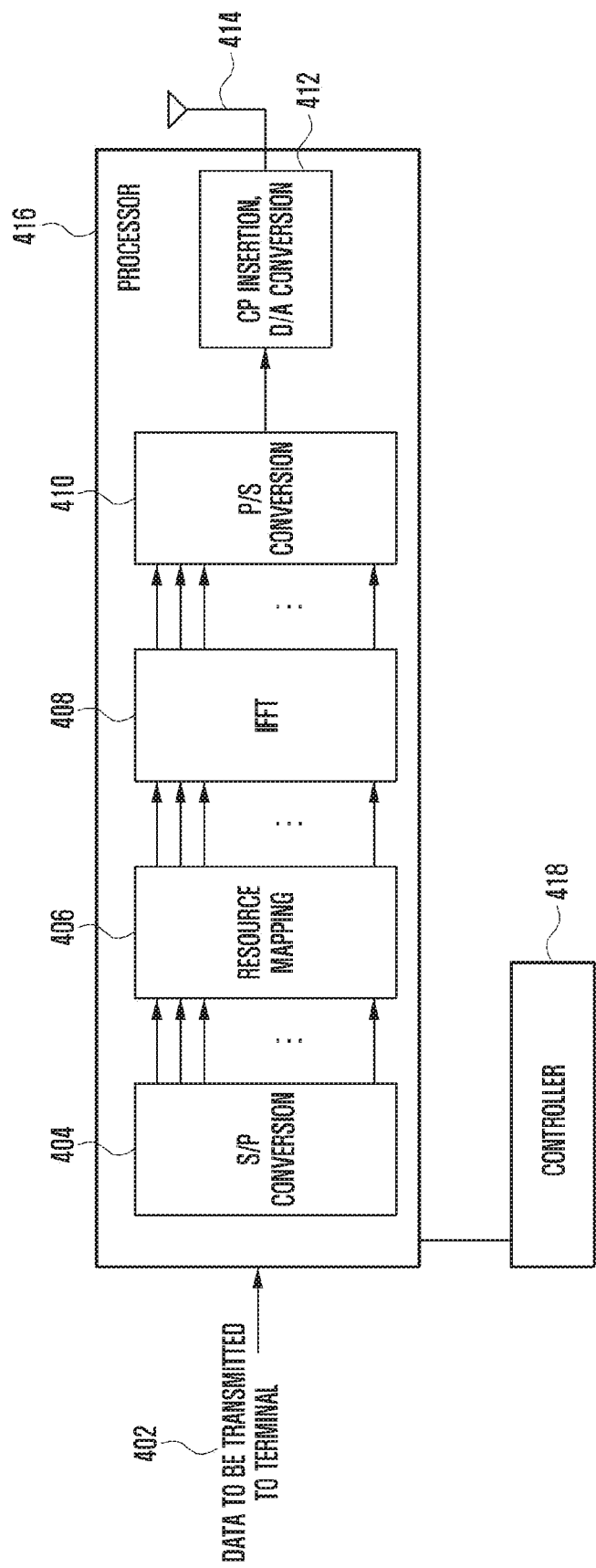
FIG. 4 is a block diagram illustrating operations for signal transmission in the downlink of the LTE base station.
Figure 5:
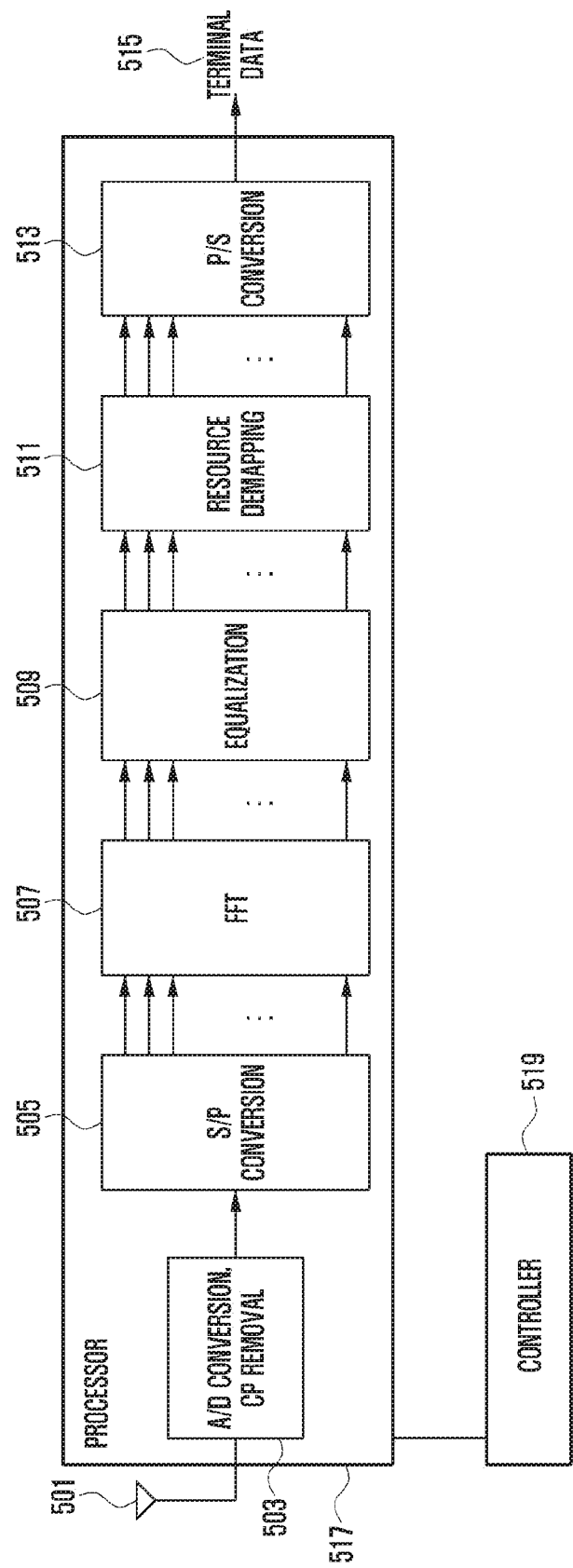
FIG. 5 is a block diagram illustrating operations for signal reception in the downlink of the LTE terminal.

FIGS. 4 and 5 are block diagrams illustrating signal transmission and reception operations of the base station and the terminal in the downlink of the LTE system using orthogonal frequency division multiple access (OFDMA).

FIG. 4 is a block diagram illustrating operations for signal transmission in the downlink of the LTE base station.

With reference to FIG. 4, in the base station, serial-to-parallel conversion is performed on the data 402 to be transmitted to the terminal according to the number of allocated subcarriers (404). In this step, the data sequence is converted into a vector form. The data is mapped to the position of the subcarriers corresponding to the allocated frequency resource (406), and inverse fast Fourier transform (IFFT) is performed (408). Parallel-to-serial conversion is performed (410), a cyclic prefix (CP) is inserted and digital-to-analog (D/A) conversion is performed (412), and the resulting signal is transmitted through the antenna (414). The above process is processed by the processor 416 for transmission through the antenna, and the processor is controlled by the controller 418.

FIG. 5 is a block diagram illustrating operations for signal reception in the downlink of the LTE terminal.

With reference to FIG. 5, the terminal samples the signal received by the antenna 501. The signal is analog-to-digital (A/D) converted, and the CP is removed (503). Serial-to-parallel conversion is performed (505), and fast Fourier transform (FFT) is performed (507). Equalization is performed using channel information (509). The portion corresponding to the allocated resource is extracted (511). Parallel-to-serial conversion is performed (513), and the data for the terminal is obtained (515). The above process from signal reception through the antenna 501 is processed by the processor 517, and the processor is controlled by the controller 519.

Figure 6:
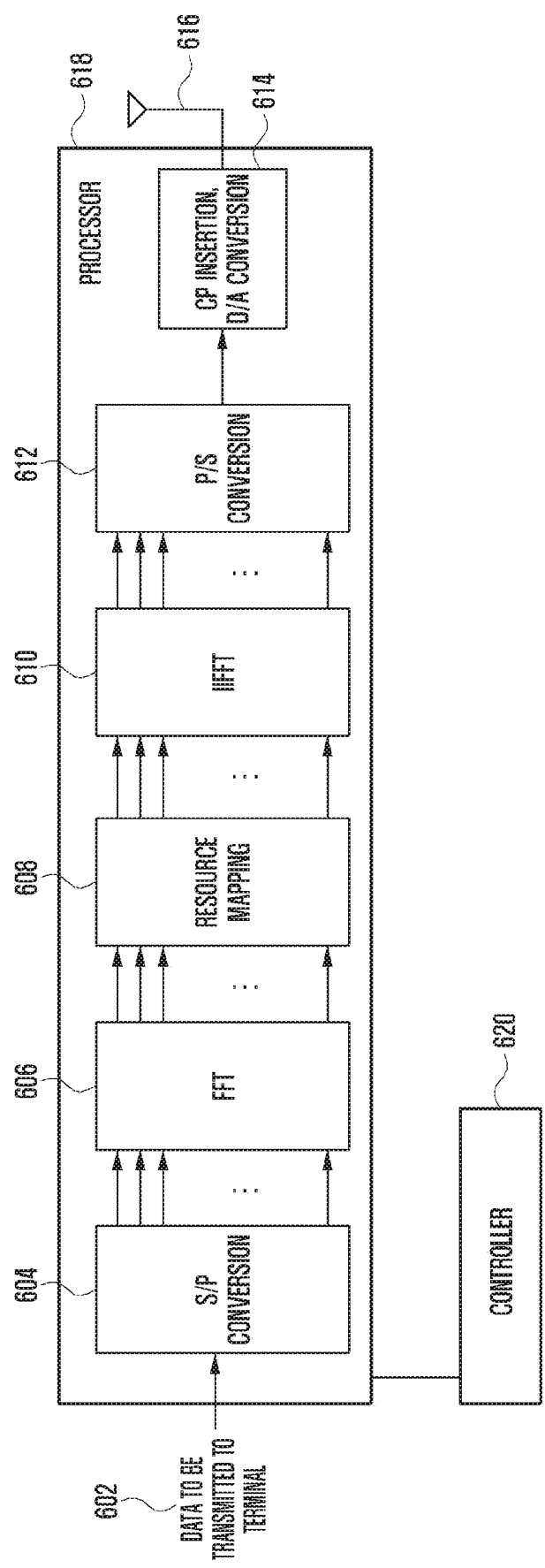
FIG. 6 is a block diagram illustrating operations for signal transmission in the uplink of the LTE terminal.
Figure 7:
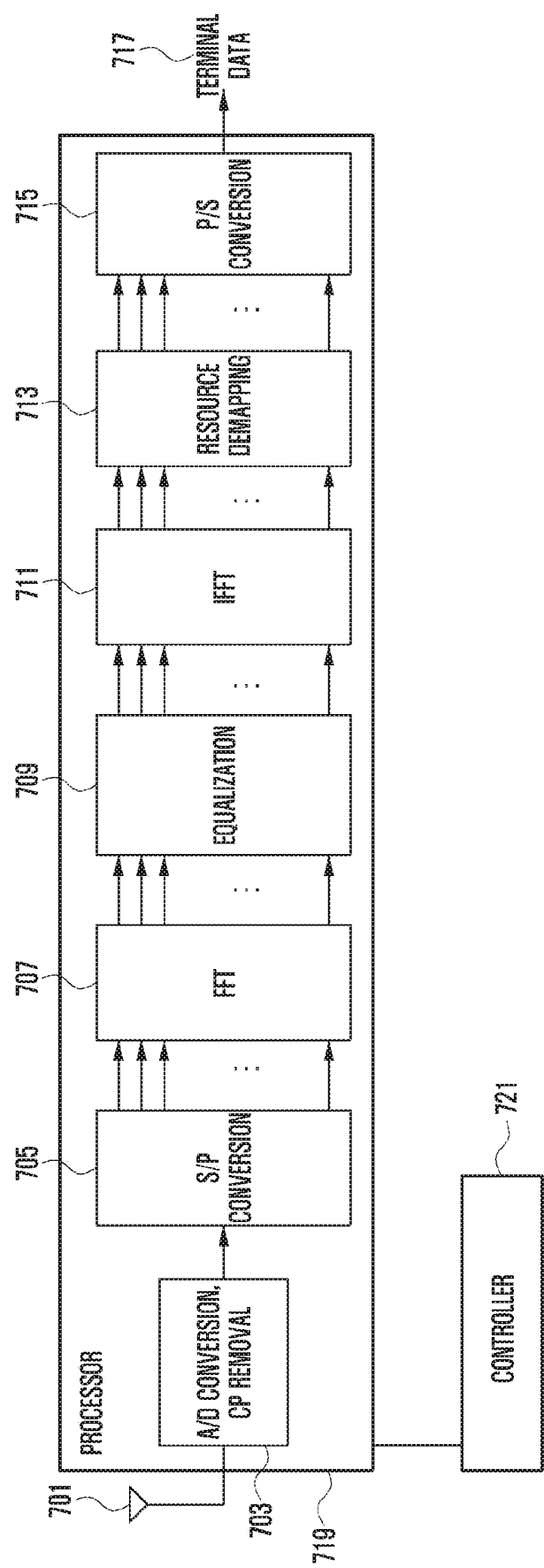
FIG. 7 is a block diagram illustrating operations for signal reception in the uplink of the LTE base station.

FIGS. 6 and 7 are block diagrams illustrating signal transmission and reception operations of the base station and the terminal in the uplink of the LTE system using SC-FDMA.

FIG. 6 is a block diagram illustrating operations for signal transmission in the uplink of the LTE terminal.

With reference to FIG. 6, in the terminal, serial-to-parallel conversion is performed on the data 602 to be transmitted to the base station according to the number of subcarriers allocated to the terminal (604). In this step, the data sequence is converted into a vector form. FFT is performed (606), the data is mapped to the position of the subcarriers corresponding to the allocated frequency resource (608), and IFFT is performed (610). Parallel-to-serial conversion is performed (612), a CP is inserted and D/A conversion is performed (614), and the resulting signal is transmitted through the antenna (616). The above process is processed by the processor 618 for transmission through the antenna 616, and the processor is controlled by the controller 620.

FIG. 7 is a block diagram illustrating operations for signal reception in the uplink of the LTE base station.

With reference to FIG. 7, the base station samples the signal received by the antenna 701. The signal is analog-to-digital (A/D) converted, and the CP is removed (703). Serial-to-parallel conversion is performed (705), and FFT is performed (707). Equalization is performed using channel information (709), and IFFT is performed (711). The portion corresponding to the resource allocated to the terminal is extracted (713). Parallel-to-serial conversion is performed (715), and the data for the terminal is obtained (717). The above process from signal reception through the antenna 701 is processed by the processor 719, and the processor is controlled by the controller 721.

Transmission and reception operations of the LTE base station and the LTE terminal are described with reference to FIGS. 4, 5, 6 and 7. Next, a description is given of transmission and reception operations of the IoT terminal and the LTE base station supporting the IoT terminal with reference to FIGS. 8, 9, 10 and 11.

Figure 8:
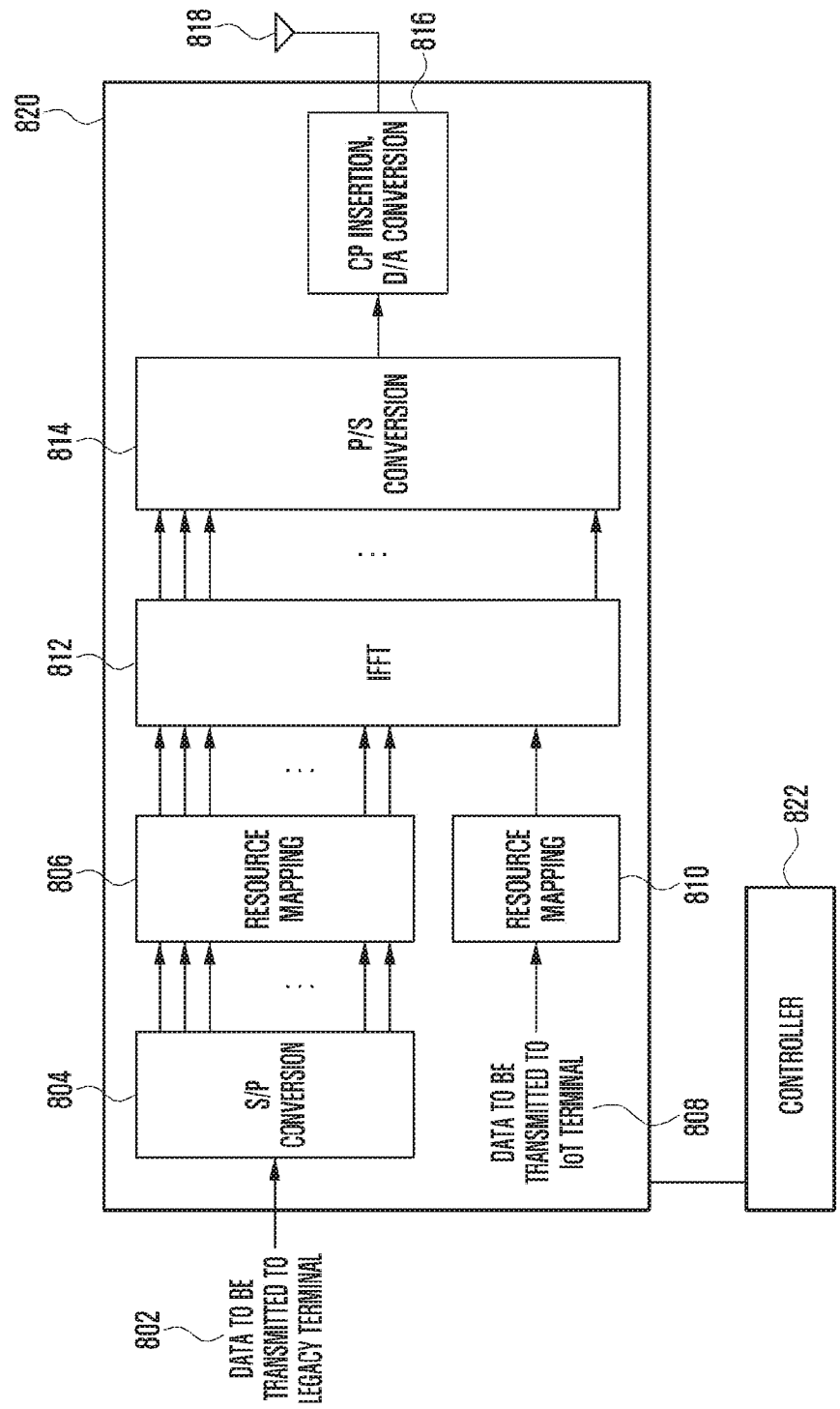
FIG. 8 is a block diagram illustrating operations for signal transmission in the downlink of the LTE base station supporting IoT terminals.
Figure 9:
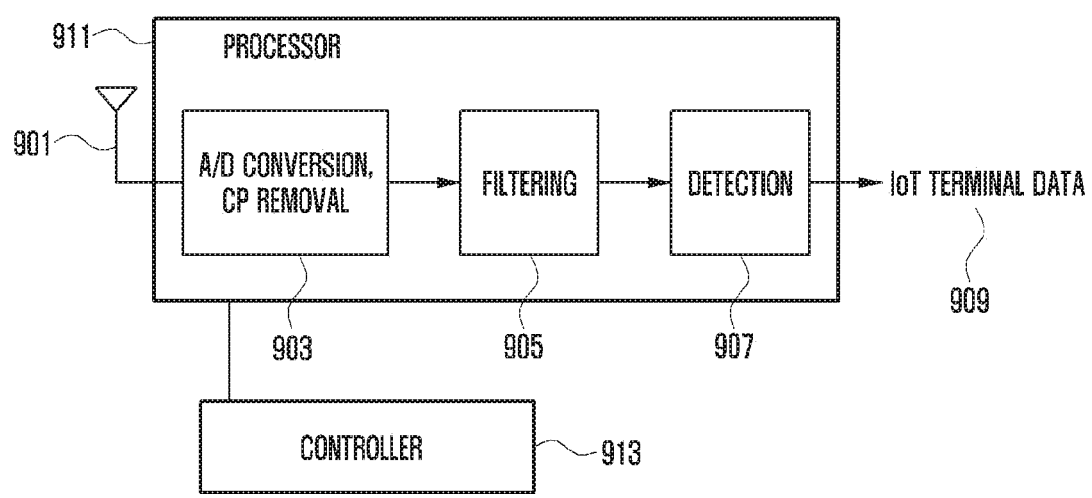
FIG. 9 is a block diagram illustrating operations for signal reception in the downlink of the IoT terminal.

FIGS. 8 and 9 are block diagrams illustrating signal transmission and reception operations of the base station and the IoT terminal in the downlink of the LTE system supporting IoT terminals based on OFDMA.

FIG. 8 is a block diagram illustrating operations for signal transmission in the downlink of the LTE base station supporting IoT terminals.

With reference to FIG. 8, in the base station, serial-to-parallel conversion is performed on the data 802 to be transmitted to a legacy LTE terminal according to the number of allocated subcarriers (804), and the data is mapped to the position of the subcarriers corresponding to the allocated frequency resource (806). Meanwhile, the data 808 to be transmitted to the IoT terminal is mapped to the position of the subcarrier allocated to the IoT terminal (810). Thereafter, IFFT is performed (812), parallel-to-serial conversion is performed on the vector produced by IFFT (814), a CP is inserted and D/A conversion is performed (816), and the resulting signal is transmitted through the antenna (818). The above process is processed by the processor 820 for transmission through the antenna, and the processor is controlled by the controller 822.

FIG. 9 is a block diagram illustrating operations for signal reception in the downlink of the IoT terminal.

With reference to FIG. 9, the terminal samples the signal received by the antenna 901, the signal is A/D converted, and the CP is removed (903). Filtering is performed through a filter corresponding to the allocated subcarrier (905). Detection is performed to recover the transmitted data (907), and the data for the IoT terminal is obtained (909). The signal is received through the antenna 901, and the above process is processed by the processor 911 and the processor is controlled by the controller 913.

Figure 10:
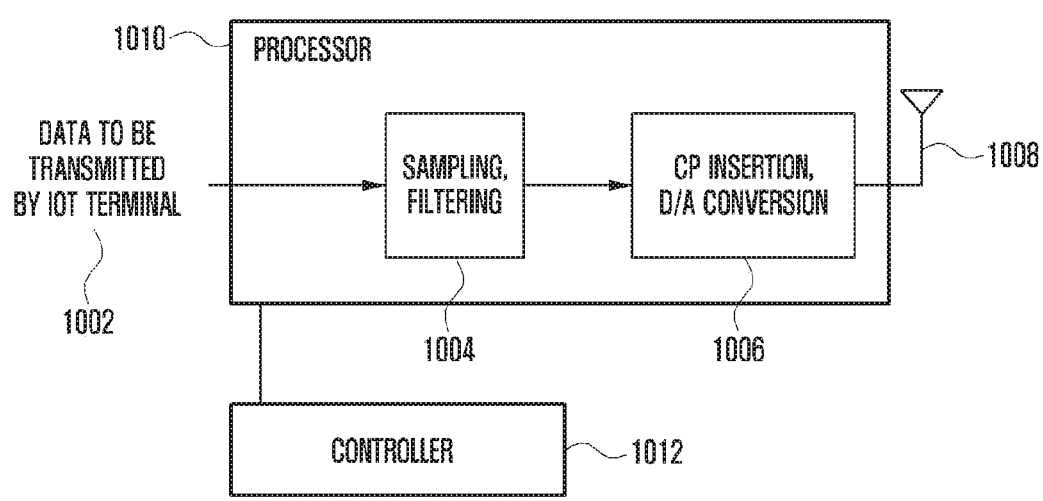
FIG. 10 is a block diagram illustrating operations for signal transmission in the uplink of the IoT terminal.
Figure 11:
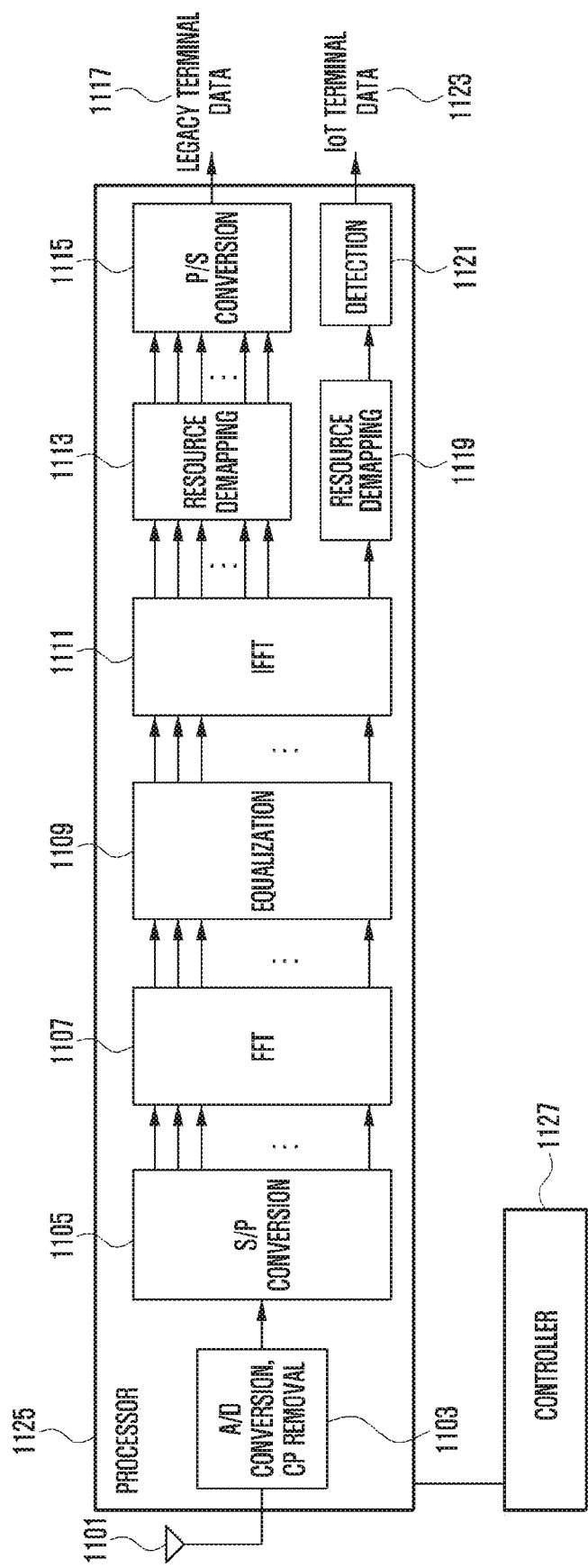
FIG. 11 is a block diagram illustrating operations for signal reception in the uplink of the LTE base station supporting IoT terminals.

FIGS. 10 and 11 are block diagrams illustrating signal transmission and reception operations of the base station and the IoT terminal in the uplink of the LTE system supporting IoT terminals based on SC-FDMA.

FIG. 10 is a block diagram illustrating operations for signal transmission in the uplink of the IoT terminal.

With reference to FIG. 10, the IoT terminal filters the IoT data 1002 to be transmitted to the base station according to the subcarrier allocated to the IoT terminal (1004). A CP is inserted and D/A conversion is performed (1006), and the resulting signal is transmitted through the antenna (1008). The above process is processed by the processor 1010, the signal is transmitted through the antenna 1008, and the processor is controlled by the controller 1012.

FIG. 11 is a block diagram illustrating operations for signal reception in the uplink of the LTE base station supporting IoT terminals.

With reference to FIG. 11, the base station samples the signal received by the antenna 1101. The signal is A/D converted, and the CP is removed (1103). Serial-to-parallel conversion is performed (1105), and FFT is performed (1107). Equalization is performed using channel information (1109), and IFFT is performed (1111). The portion corresponding to the resource allocated to the normal LTE terminal is extracted (1113), parallel-to-serial conversion is performed (1115), and the data from the normal LTE terminal is obtained (1117). Meanwhile, the portion corresponding to the subcarrier allocated to the IoT terminal is extracted from the result of the IFFT block 1111 (1119), detection is performed (1121), and the data for the IoT terminal is obtained (1123). The signal is received through the antenna 1001, and the above process is processed by the processor 1125 and the processor is controlled by the controller 1127.

In one embodiment, as described above, the base station supporting IoT terminals may extract both the data of the normal LTE terminal and the data of the IoT terminal from the IFFT block of the receiving end. Alternatively, the base station may separately perform digital filtering to extract the data for the IoT terminal after A/D conversion of the received signal and CP removal (1103). The above description is only an embodiment of the present invention and the present invention is not necessarily limited to such operations.

Next, as the first embodiment, a description is given of an operation scheme for the base station to allocate one subcarrier to one IoT terminal in a RB configured to support IoT terminals in downlink signal transmission.

Figure 12:
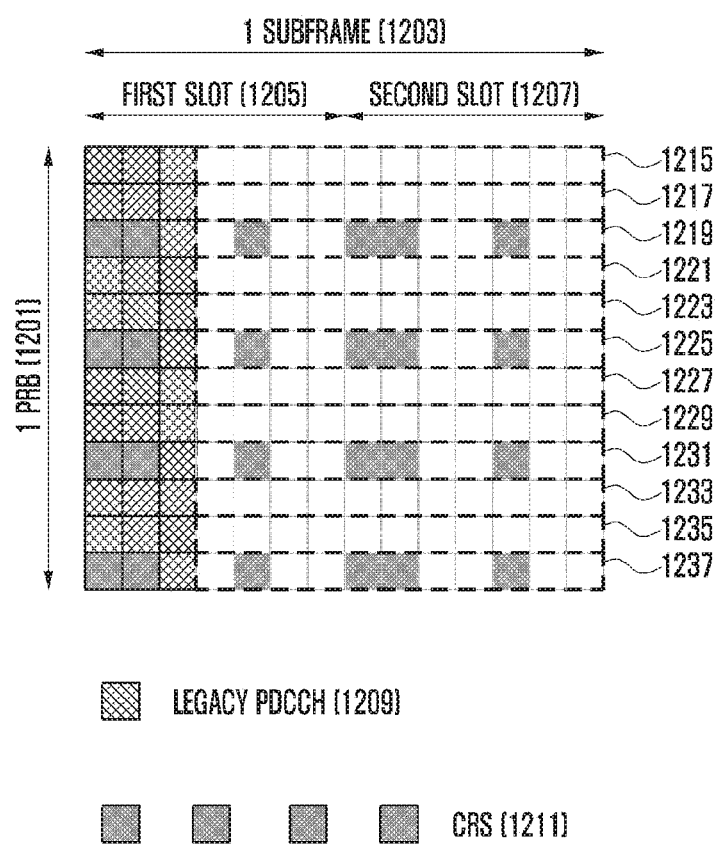
FIG. 12 shows one PRB pair.

FIG. 12 shows one PRB pair 1201. As shown in FIG. 12, the PRB pair includes one subframe 1203 in the time domain. PDCCH 1209 and CRS 1211 may be mapped to the first three OFDM symbols of the PRB pair. For the remaining OFDM symbols, there are 7 or 11 REs available per subcarrier. In the subcarrier 1219, 1225, 1231 or 1237 including a CRS, 7 REs may be used to transmit data and/or control signals for the IoT terminal. In the subcarrier 1215, 1217, 1221, 1223, 1227, 1229, 1233 or 1235 not including a CRS, 11 REs may be used to transmit data and/or control signals for the IoT terminal.

The IoT terminal may identify the index of a subcarrier through which a downlink signal is transmitted at the time of synchronization with the base station or may receive a signal from a subcarrier indicated by the DCI transmitted by an upper layer signal or PDCCH or from a preset subcarrier, and may transmit a signal to the base station through the same or different subcarrier. The index of a subcarrier through which the downlink signal is transmitted may also be determined by the terminal identifier (RNTI) or the like.

Figure 13:
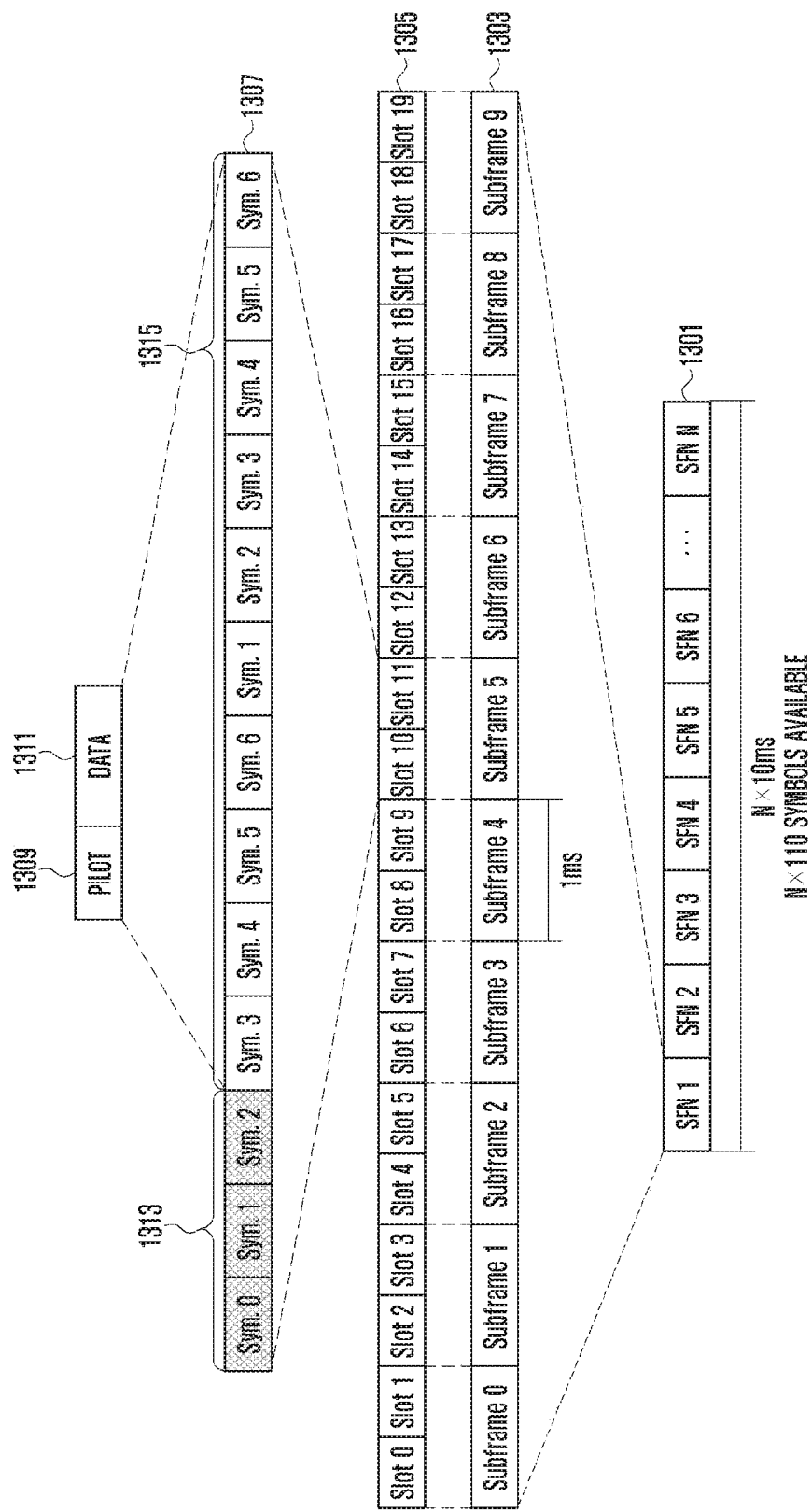
FIG. 13 illustrates the structure of a frame in the time domain when data of an IoT terminal is transmitted using a subcarrier not including the CRS.

FIG. 13 illustrates the structure of a frame in the time domain when data of an IoT terminal is transmitted using a subcarrier not including the CRS. As shown in FIG. 13, the frame of the LTE system has a length of 10 ms, and the SFN increases by 1 every time one frame passes. Thus, a total of N frames corresponds to 10*N ms (1301). One frame consists of 10 subframes each having a length of 1 ms (1303). One subframe consists of two slots each having a length of 0.5 ms (1305). One subframe includes 14 OFDM symbols (1307). Here, up to the first three OFDM symbols are used for a control resource region to transmit control information to the LTE terminal (1313). The remaining 11 OFDM symbols are used for a resource region in which data or RS is transmitted (1315). The subcarrier 1215, 1217, 1221, 1223, 1227, 1229, 1233 or 1235 not including a CRS shown in FIG. 12 may transmit a pilot, data, or control information mapped to the 11 symbols for the IoT terminal without interference as indicated by indicia 1315.

Figure 14:
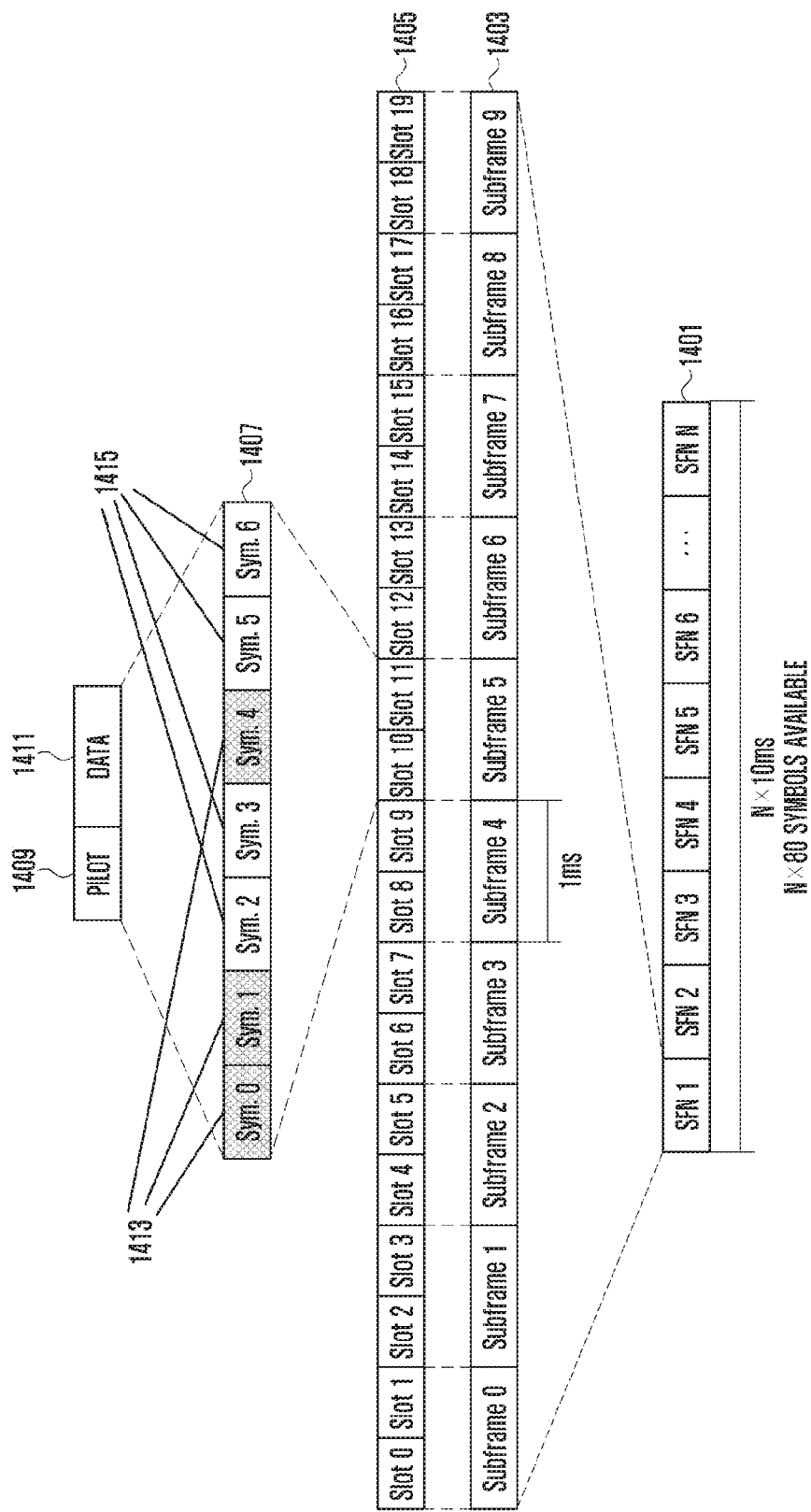
FIG. 14 illustrates the structure of a frame in the time domain when a signal of an IoT terminal is transmitted using a subcarrier including the CRS.

FIG. 14 illustrates the structure of a frame in the time domain when a signal of an IoT terminal is transmitted using a subcarrier including the CRS. As shown in FIG. 14, the frame of the LTE system has a length of 10 ms, and the SFN increases by 1 every time one frame passes. Thus, a total of N frames corresponds to 10*N ms (1401). One frame consists of 10 subframes each having a length of 1 ms (1403). One subframe consists of two slots each having a length of 0.5 ms (1405). One subframe includes 14 OFDM symbols (1407). The $0^{th}$, $1^{st}$ and $4^{th}$ OFDM symbols in one slot are used to transmit a CRS and thus are not used to transmit data for the IoT terminal (1413). The $2^{nd}$, $5^{th}$ and $6^{th}$ OFDM symbols are not used to transmit a CRS and thus may be used to transmit data for the IoT terminal (1415).

The base station may use the subcarrier 1219, 1225, 1231 or 1237 including a CRS shown in FIG. 12 to transmit a pilot, data, or control information mapped to the 4 symbols ($2^{nd}$, $3^{rd}$, $5^{th}$ and $6^{th}$ OFDM symbols of a slot as indicated by indicia 1415) for the IoT terminal without interference. As an example of FIG. 14, the base station can be configured to use only up to two OFDM symbols in one subframe for control information transmission for a normal LTE terminal. In this case, the symbols of the same order in the first slot and the second slot of a subframe may be used to transmit pilots or data for the IoT terminal. When the base station is configured to use up to three OFDM symbols in one subframe for control information transmission for a normal LTE terminal, the third symbol may be not used to transmit control information for the IoT terminal.

Figure 15A:
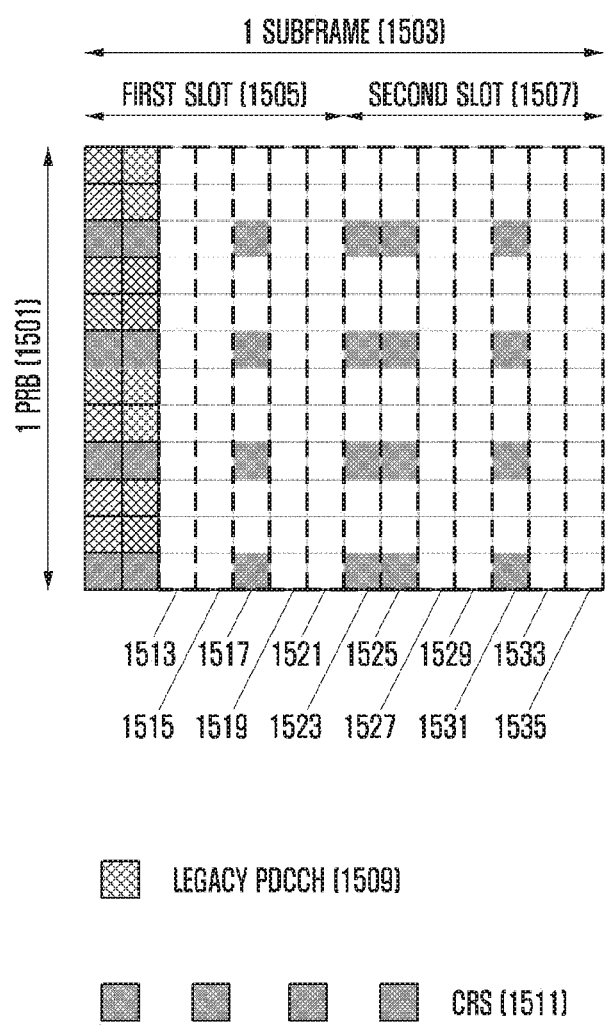
FIG. 15A is another illustration of resource allocation used by the LTE base station for transmitting a signal to the IoT terminal in the first embodiment.

FIG. 15A is another illustration of resource allocation used by the LTE base station for transmitting a signal to the IoT terminal in the first embodiment. With reference to FIG. 15A, when control information (PDCCH) for the LTE terminal is transmitted using 2 OFDM symbols in one subframe, the remaining 12 OFDM symbols 1513, 1515, 1517, 1519, 1521, 1523, 1525, 1527, 1529, 1531, 1533 and 1535 may be used for signal transmission of the IoT terminal. Among these, at least one subcarrier associated with the OFDM symbols 1513, 1515, 1519, 1521, 1527, 1529, 1533 and 1535 including a CRS can be used for transmitting a signal including a pilot or data for the IoT terminal. At least one subcarrier associated with the OFDM symbols 1517, 1523, 1525 and 1531 not including a CRS can be used for transmitting a signal including a pilot or data for the IoT terminal. In this case, the frame structure is the same as that shown in FIG. 14.

Figure 15B:
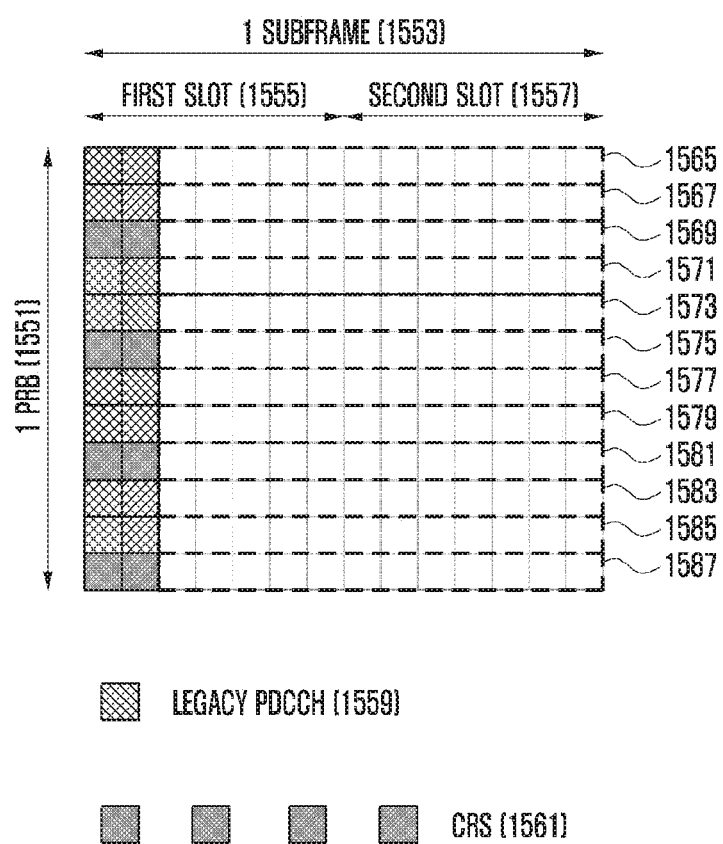
FIG. 15B is another illustration of resource allocation used by the LTE base station for transmitting a signal to the IoT terminal in the first embodiment.

FIG. 15B is another illustration of resource allocation used by the LTE base station for transmitting a signal to the IoT terminal in the first embodiment. With reference to FIG. 15B, the base station can designate a specific subframe as a multicast-broadcast single-frequency network (MBSFN) subframe so that the CRS can be transmitted to the terminal using the first two OFDM symbols only. When the base station configures an MBSFN subframe, the CRS 1561 and the PDCCH 1559 are mapped to the first and second OFDM symbols of the subframe and the CRS is not mapped to the remaining symbols. The remaining OFDM symbols except for the first two OFDM symbols may be used for transmission and reception to and from the IoT terminal. Among the subcarriers 1565, 1567, 1569, 1571, 1573, 1575, 1577, 1579, 1581, 1583, 1585 and 1587 of the subframe set as a MBSFN subframe, the base station may allocate a specific subcarrier to the IoT terminal for signal transmission.

The above scheme of downlink resource allocation for the IoT terminal can also be applied to uplink resource allocation.

Figure 16:
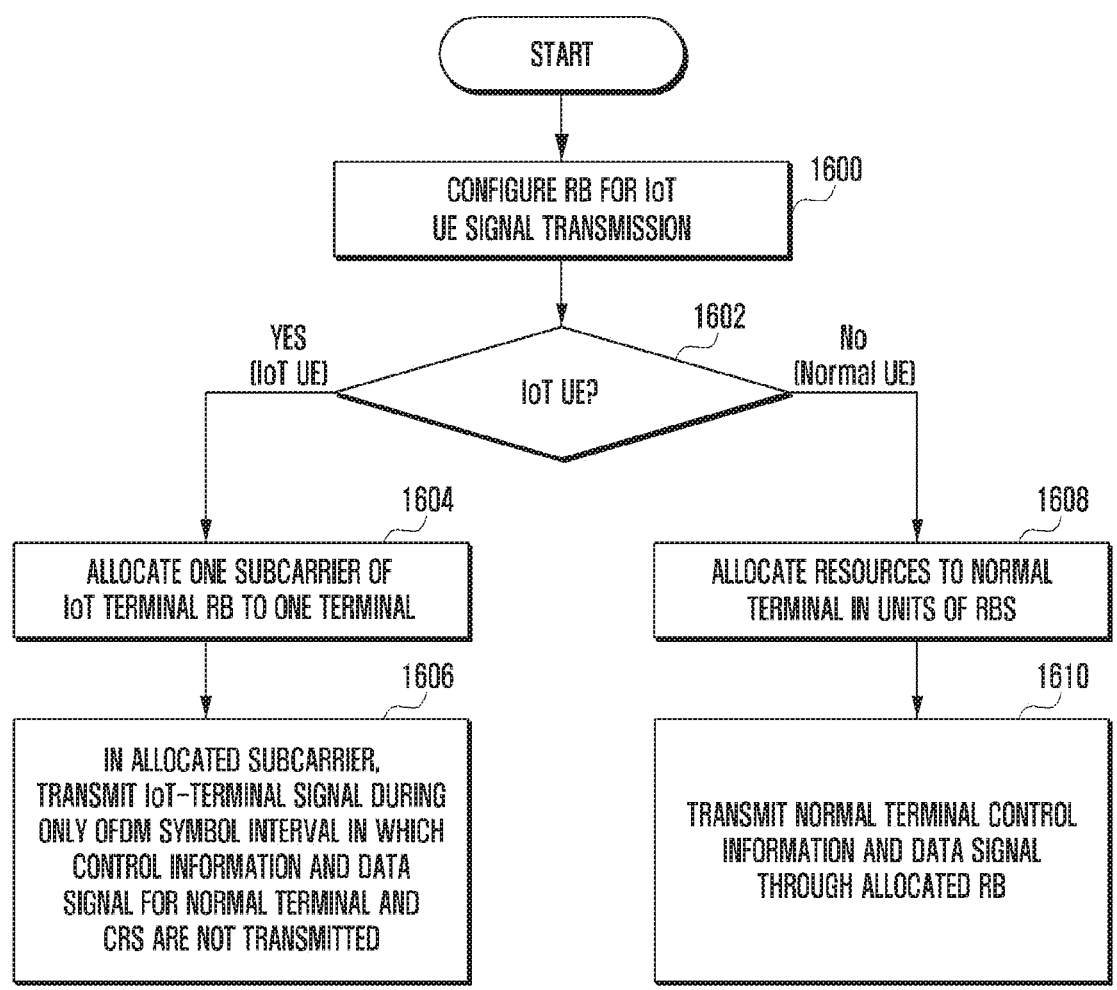
FIG. 16 illustrates a procedure for the base station to allocate resources for signal transmission to an IoT terminal and a normal LTE terminal according to the first embodiment of the present invention.

FIG. 16 illustrates a procedure for the base station to allocate resources for signal transmission to an IoT terminal and a normal LTE terminal according to the first embodiment of the present invention. With reference to FIG. 16, the base station configures resource blocks for supporting IoT terminals (1600). The base station determines whether the terminal to receive a signal is an IoT terminal (1062). If the terminal to receive a signal is an IoT terminal, the base station selects one subcarrier from the IoT-terminal RB and allocates the selected subcarrier to the IoT terminal (1604). In the allocated subcarrier, the base station transmits an IoT-terminal signal during only an OFDM symbol interval in which control and data signals for a normal terminal and the CRS are not transmitted (1606). If the terminal to receive a signal is a normal LTE terminal (not an IoT terminal), the base station allocates resources (among non-IoT terminal RBs) to the normal LTE terminal in units of RBs (1608), and transmits normal-terminal control information, pilot, or data signal through the allocated RB (1610).

Figure 17:
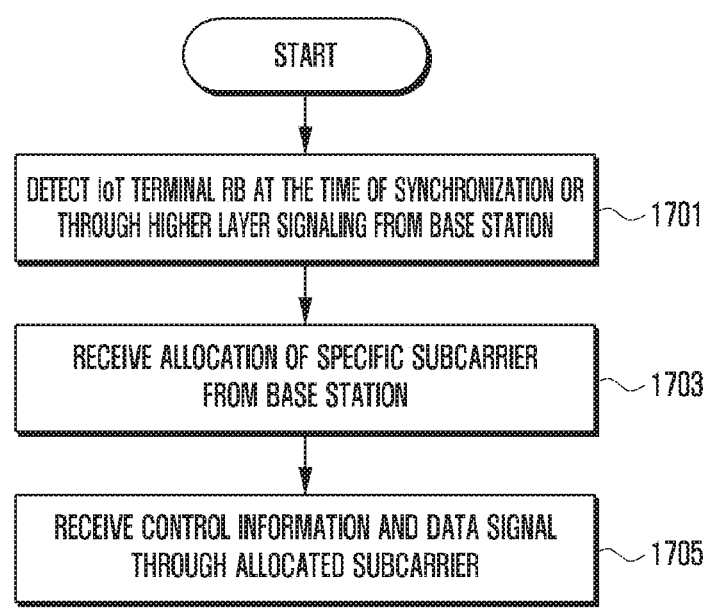
FIG. 17 illustrates a procedure for the IoT terminal to receive a downlink signal on an allocated subcarrier according to the first embodiment of the present invention.

FIG. 17 illustrates a procedure of the IoT terminal to receive a downlink signal on an allocated subcarrier according to the first embodiment of the present invention. The terminal detects an IoT-terminal RB at the time of synchronization or is allocated an IoT-terminal RB by receiving a higher layer signaling from the base station (1701). The terminal is allocated a specific subcarrier of the allocated RB by the base station (1703). Such a specific subcarrier may be allocated through a higher layer signaling or physical layer control signal. The terminal receives a control signal and data signal from the base station through the allocated downlink subcarrier (1705).

Next, as the second embodiment for uplink signal transmission of an IoT terminal, a description is given of a scheme in which the normal LTE terminal is prevented from using a specific RB among the resources for PUCCH or PUSCH transmission and a given subcarrier of the specific RB is allocated to the IoT terminal.

Figure 18:
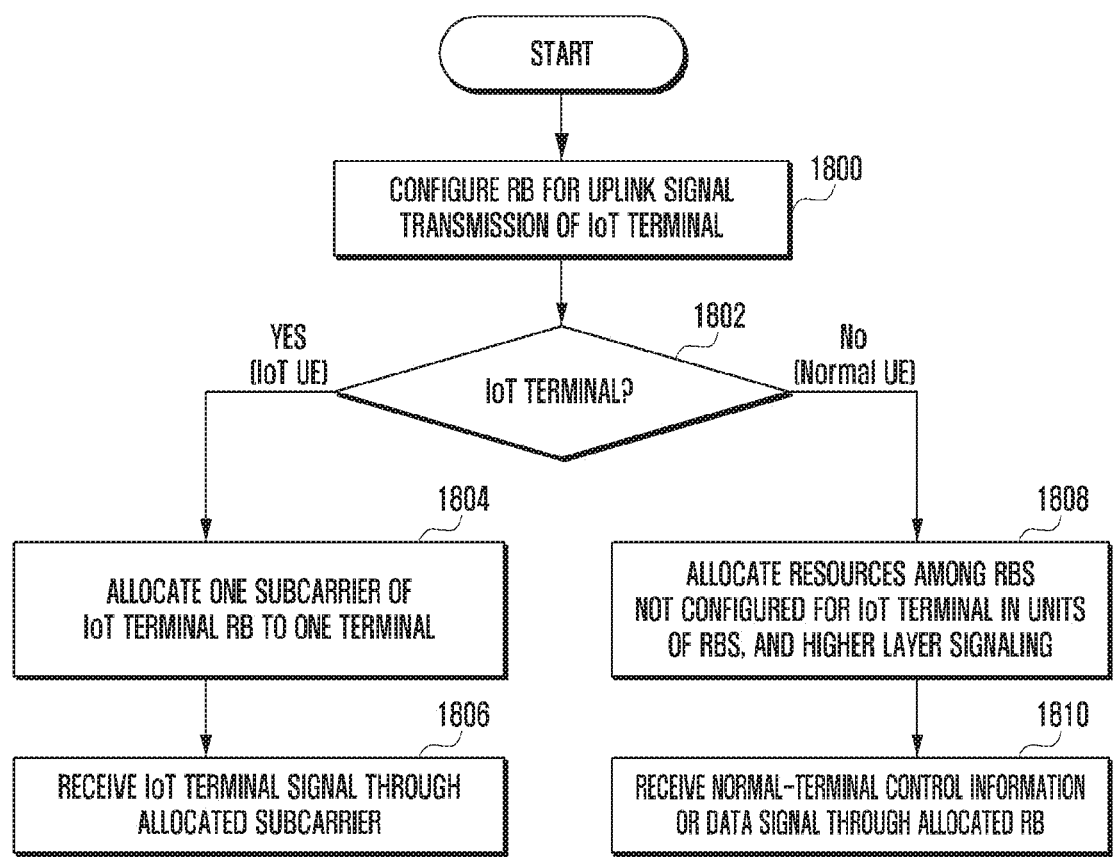
FIG. 18 illustrates a procedure for the base station to allocate an RB, which has been assigned to a normal LTE terminal for transmitting an uplink control signal, to an IoT terminal for control and data signal transmission according to the second embodiment of the present invention.

FIG. 18 illustrates a procedure for the base station to allocate an RB, which has been assigned to a normal LTE terminal for transmitting an uplink control signal, to an IoT terminal for control and data signal transmission according to the second embodiment of the present invention. With reference to FIG. 18, the base station configures an RB for uplink signal transmission of the IoT terminal (1800). The base station determines whether the terminal to transmit a signal is an IoT terminal (1802). If the terminal to transmit a signal is an IoT terminal, the base station selects one subcarrier of the IoT-terminal RB and allocates the selected subcarrier to the IoT terminal (1804). For subcarrier allocation, the base station may notify the IoT terminal of the index of the allocate subcarrier through a higher layer signaling, or there may be a preset functional relationship that enables the terminal to derive the subcarrier index to be used for uplink transmission from the subcarrier index used for downlink transmission. Through the allocated subcarrier, the IoT terminal transmits an uplink signal including control information or data, and the base station receives the signal from the IoT terminal (1806). If the terminal to transmit a signal is a normal LTE terminal (not an IoT terminal), the base station allocates resources (among non-IoT terminal RBs) to the normal LTE terminal in units of RBs (1808), and receives normal-terminal control information or data signal through the allocated RB (1810).

Figure 19:
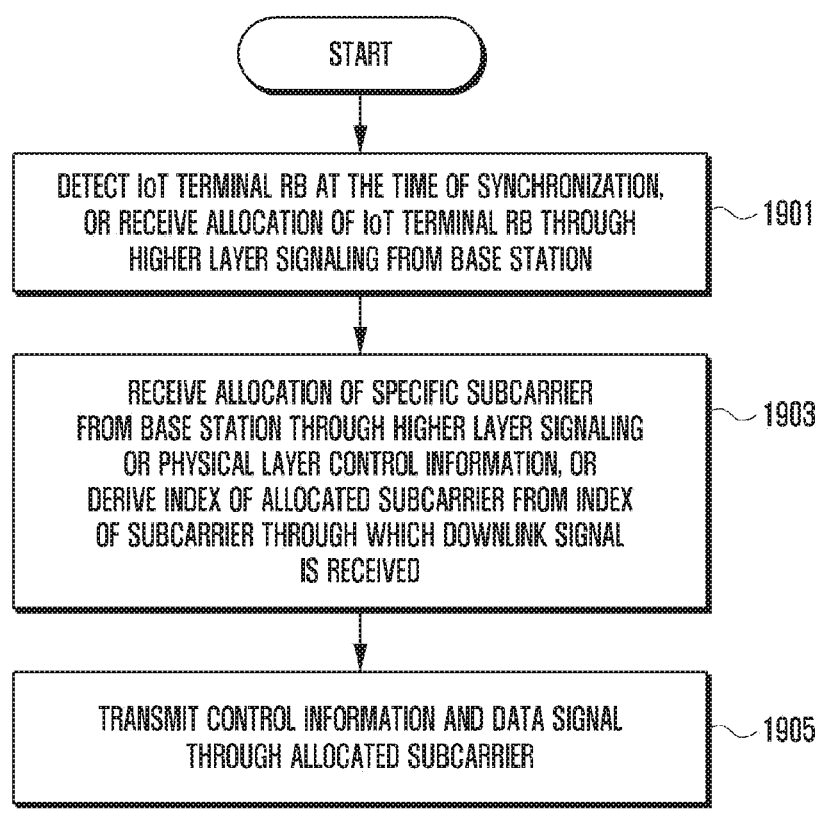
FIG. 19 illustrates a procedure for the IoT terminal to transmit an uplink control and data signal on an allocated subcarrier according to the second embodiment of the present invention.

FIG. 19 illustrates a procedure for the IoT terminal to transmit an uplink control and data signal on an allocated subcarrier according to the second embodiment of the present invention. With reference to FIG. 19, the terminal detects an IoT-terminal RB at the time of synchronization or is allocated an IoT-terminal RB by the base station through a higher layer signaling (1901). The terminal is allocated a specific subcarrier of the allocated RB by the base station through a higher layer signaling or physical layer control information, or derives the index of an allocated subcarrier from the index of the subcarrier through which the downlink signal has been received (1903). The terminal transmits control information and a data signal to the base station through the allocated uplink subcarrier (1905).

Figure 20:
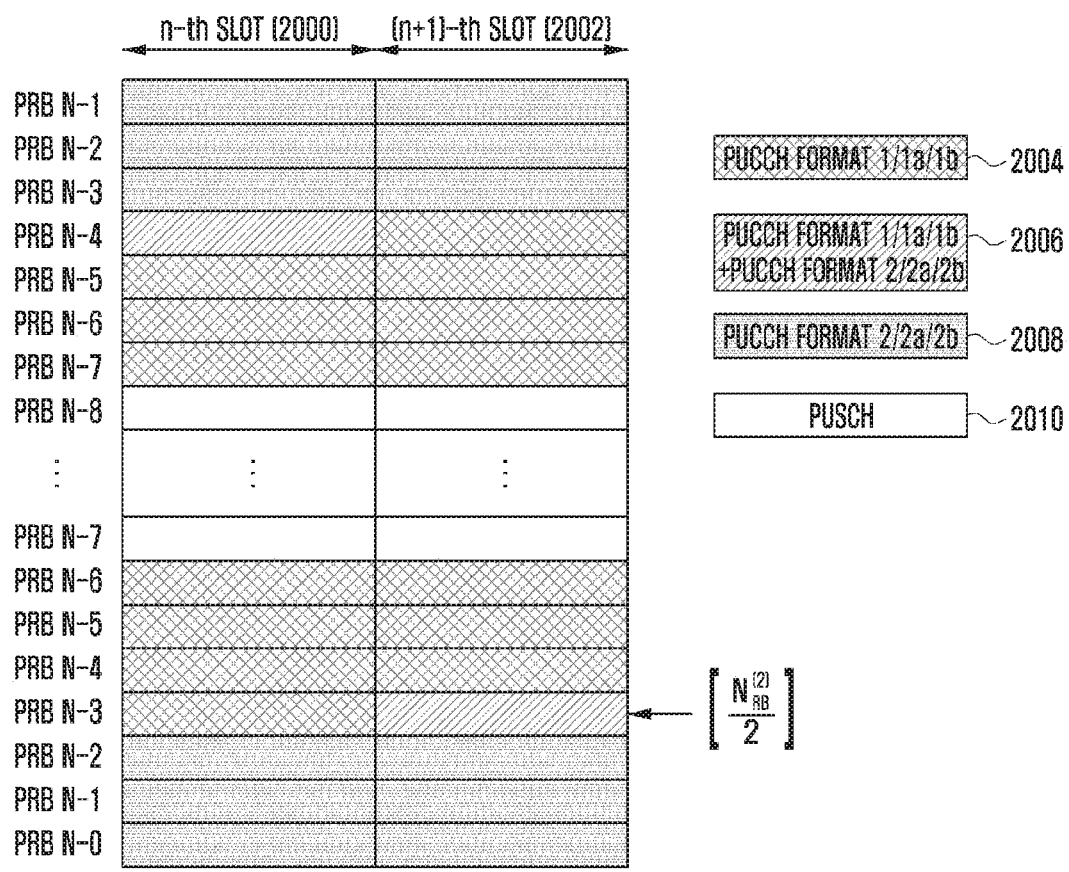
FIG. 20 illustrates allocating a portion of resources for the uplink control channel PUCCH as resources for IoT terminals.

FIG. 20 illustrates allocating a portion of resources for the uplink control channel PUCCH as resources for IoT terminals. With reference to FIG. 20, the RB used for PUCCH format 1/1a/1b (2004) and the RB used for PUCCH format 2/2a/2b (2008) are distinguished from each other based on $N_{RB}^{(2)}$ notified by a higher layer signaling. The $$\left[\frac{N_{RB}^{(2)}}{2}\right]$$

-th RB and N-

$$\left[\frac{N_{RB}^{(2)}}{2}\right]$$

-th RB (2006) may be used to transmit both PUCCH format 1/1a/1b and PUCCH format 2/2a/2b. The RBs located in the middle (2010) are used for PUSCH transmission for uplink data transmission. PUCCH format 3 can be transmitted on any RB without limitation according to the higher layer signaling. The RBs used for PUCCH formats 1/1a/1b, 2/2a/2b, and 3 are transmitted to the normal LTE terminal in the form of PUCCH resource indexes $n_{PUCCH}^{(1,\tilde{p})}$, $n_{PUCCH}^{(2,\tilde{p})}$, and $n_{PUCCH}^{(3,\tilde{p})}$ respectively. $n_{PUCCH}^{(1,\tilde{p})}$ is determined according to higher layer signaling parameters and the CCE number indicating PDCCH or EPDCCH transmission. Hence, the base station can configure an RB to be used for uplink signal transmission of the IoT terminal by preventing $n_{PUCCH}^{(1,\tilde{p})}$, $n_{PUCCH}^{(2,\tilde{p})}$, and $n_{PUCCH}^{(3,\tilde{p})}$ (which are determined according to a higher layer signaling to the normal LTE terminal and the CCE number indicating PDCCH or EPDCCH transmission) from indicating the RB to be used for the IoT terminal.

According to the second embodiment of the present invention, the base station can adjust the allocation of PUSCH resources to normal LTE terminals so that at least one RB is emptied, and assign the emptied RB to the IoT terminal so that the IoT terminal can transmit and receive a signal on a specific subcarrier.

Figure 21:
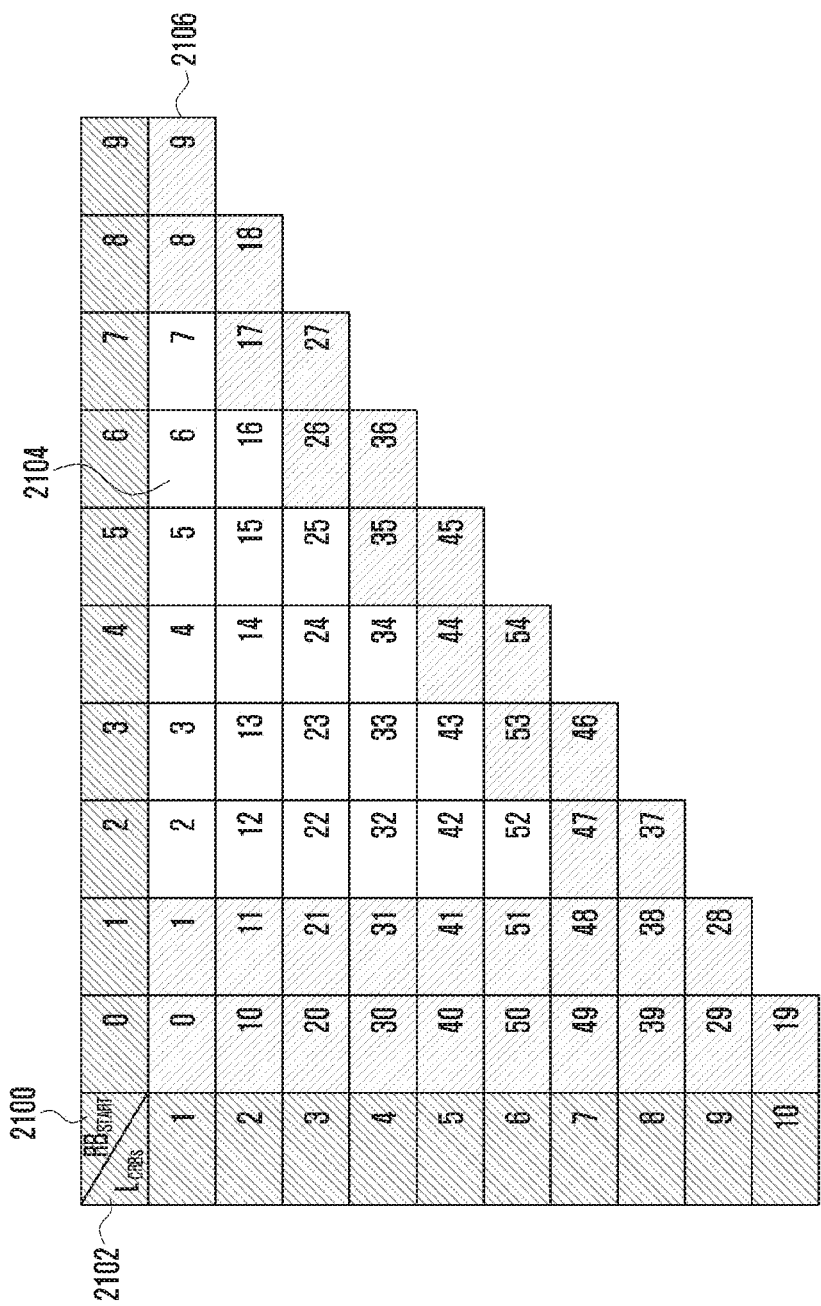
FIG. 21 illustrates an example where the base station adjusts resource indication values to use PUSCH resources of a legacy LTE terminal as resources for an IoT terminal.

FIG. 21 illustrates an example where the base station adjusts the resource indication value (RIV), which is used to notify the terminal of uplink resource allocation through the PDCCH or EPDCCH, to utilize PUSCH resources of a legacy LTE terminal as resources for an IoT terminal. FIG. 21 shows a case where the total number of uplink RBs is 10 and the uplink resource allocation type is 0. The $RB_{START}$ (2100) is the index of the first RB among the RBs allocated to a specific terminal for PUSCH transmission, and $L_{CRBs}$ (2102) is the number of allocated RBs. $N_{RB}^{UL}$ indicates the total number of uplink RBs. In FIG. 21, the RIV is given by the following equation.

$$(L_{CRBs}-1) \leq \lfloor N_{RB}^{UL}/2 \rfloor \text{이면}, RIV = N_{RB}^{UL}(L_{CRBs}-1) + RB_{START}$$

$$\text{다른 경우는}, RIV = N_{RB}^{UL}(N_{RB}^{UL}-L_{CRBs}+1) + (N_{RB}^{UL}-1-RB_{START})$$
[Equation 1]

In FIG. 21, shaded RIV values (2106) are RIV values that should not be used in order not to use 2 RBs on both ends of a total of 10 RBs. That is, if these RIV values are not selected, RB 0, RB 1, RB 8, and RB 9 are not allocated to the terminal. Hence, to allocate RB 0, RB 1, RB 8, and RB 9 to the IoT terminal and allocate RBs located in the middle to the normal LTE terminal, the base station must select one RIV value from among the non-shaded RIV values (2104) in FIG. 21 when transmitting a RIV value through the PDCCH or EPDCCH to allocate PUSCH resources to the normal LTE terminal.

In the above example, the PUSCH resource is allocated to the terminal using uplink resource allocation type 0. A similar approach may be applied to the case where resource allocation type 1 is utilized to allocate PUSCH resources to the terminal. That is, the uplink resource for the IoT terminal may be allocated by imposing restrictions on the PUSCH resources that can be allocated to the normal LTE terminal.

Next, as the third embodiment, a description is given of a method for obtaining filter coefficients when the IoT terminal transmits and receives a signal using one subcarrier through filtering without FFT or IFFT operation.

FIG. 9 is a block diagram of the receiver of the IoT terminal for receiving a signal in the downlink. Unlike the normal LTE terminal receiver including an FFT/IFFT block, the IoT terminal receiver shown in FIG. 9 does not include an FFT/IFFT block and receives data on a specific subcarrier through filtering.

The following equation represents filter coefficients of the filter 905 that can be used to receive data on the $k^{th}$ subcarrier in the frequency range where the IoT terminal can receive. When the filter length is N, for n=0, 1, . . . , N−1, the filter coefficient $w_n$ for receiving data corresponding to the $k^{th}$ subcarrier can be given by the following equation.

$$w_n = e^{i2\pi n(k-\frac{K}{2}+c)/K} \text{ for } n = 0, 1, \ldots, N-1 \quad \text{[Equation 2]}$$

In the above equation, K indicates the total number of subcarriers that can be configured for the IoT terminal to receive. The constant c may be determined according to the center frequency used in the IoT terminal receiver. When the sampling rate of the sampler 903 of the IoT terminal receiver is $R_s$ (samples/second), K can be given by the following equation.

$$K = \frac{R_s}{15 \times 10^3}$$

In FIG. 9, separate filters may be inserted after signal reception through the antenna 901 and before A/D conversion 903.

FIG. 10 is a block diagram of the transmitter of the IoT terminal for transmitting a signal in the uplink. Unlike the normal LTE terminal transmitter including an FFT/IFFT block, the IoT terminal transmitter shown in FIG. 10 does not include an FFT/IFFT block and transmits data on a specific subcarrier through filtering.

The following equation represents filter coefficients of the filter 1004 that can be used to transmit data on the $k^{th}$ subcarrier in the frequency range where the IoT terminal can transmit. When the filter length is $N_{samples}$, for n=0, 1, . . . , $N_{samples}$−1, the filter coefficient $w_n$ can be given by the following equation.

$$w_n = e^{i2\pi n(k-\frac{N}{2}+\frac{1}{2})/N_{samples}} \text{ for } k = 0, 1, \ldots, N-1 \quad \text{[Equation 4]}$$

In the above equation, K indicates the total number of subcarriers that can be configured for the IoT terminal to transmit. When the conversion rate of the D/A converter 1106 of the IoT terminal transmitter is $R_s$ (samples/second), K can be given by Equation 3 above.

In FIG. 10, separate filters may be inserted after D/A conversion 1006 and before signal transmission through the antenna 1008. Channel coding, scrambling, interleaving, and the like may be inserted before filtering 1004 of the terminal data 1002.

The IoT terminal may use the values obtained by multiplying an appropriate constant and the filter coefficient computed using Equation 2 and Equation 4 together.

Next, as the fourth embodiment, a description is given of a method for obtaining filter coefficients when the IoT terminal transmits and receives a signal using one or more subcarriers through filtering without FFT or IFFT operation.

Figure 22:
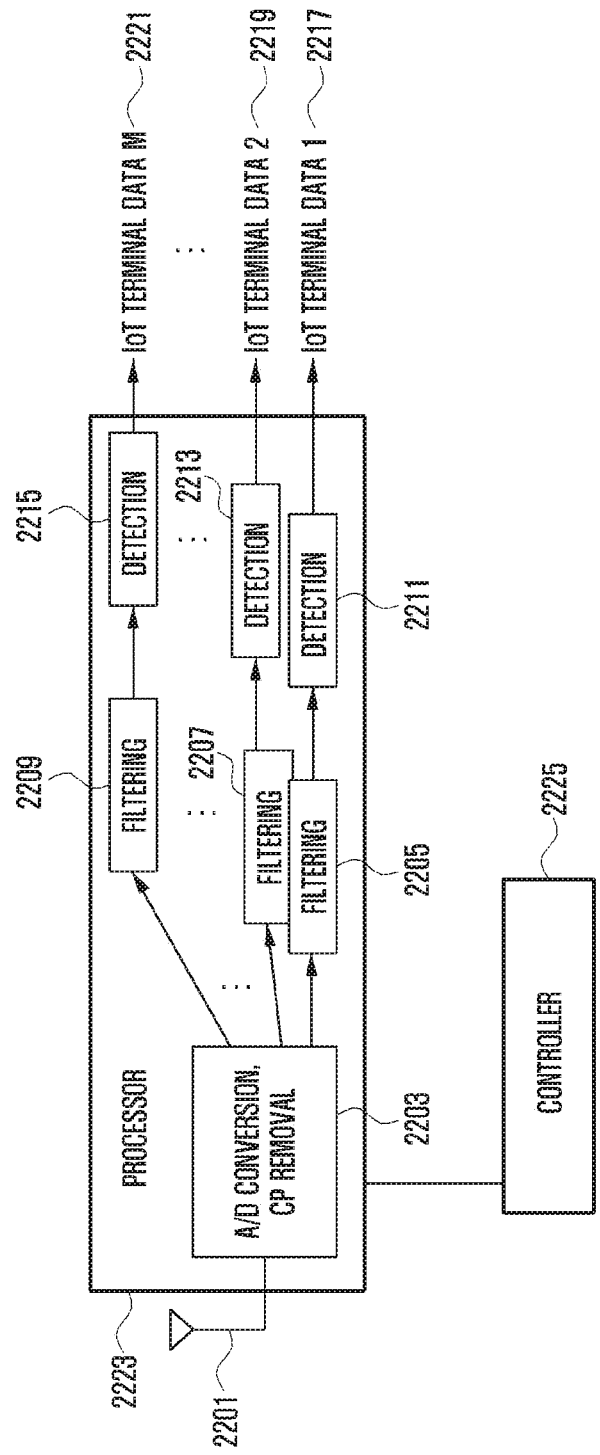
FIG. 22 is a block diagram of a receiver for the IoT terminal to receive signals using one or more subcarriers in the downlink.

FIG. 22 is a block diagram of a receiver for the IoT terminal to receive signals using one or more subcarriers in the downlink. Unlike the normal LTE terminal receiver including an FFT/IFFT block, the IoT terminal receiver shown in FIG. 22 does not include an FFT/IFFT block and receives data on each subcarrier through filtering using multiple filters 2205, 2207 and 2209.

The following equation represents filter coefficients of the filters 2205, 2207 and 2209 that can be used to receive data 1, data 2, . . . , data M respectively on the $k_1, k_2, \ldots, k_M^{th}$ (M) subcarriers in the frequency range where the IoT terminal can receive. When the filter length is $N_{samples}$, for n=0, 1, . . . , $N_{samples}$−1, the filter coefficient $w_{m,n}$ of the $m^{th}$ filter can be given by the following equation.

$$w_{m,n} = e^{i2\pi n(k-\frac{N}{2}+c)/N_{samples}} \text{ for } k = 0, 1, \ldots, N-1 \quad \text{[Equation 5]}$$

In the above equation, N indicates the total number of subcarriers that can be configured for the IoT terminal to receive. The constant c may be determined according to the center frequency used in the IoT terminal receiver. When the sampling rate of the sampler 2203 of the IoT terminal receiver is $R_s$ (samples/second), $N_{samples}$ can be given by Equation 3 above.

In FIG. 22, separate filters may be inserted after signal reception through the antenna 2201 and before A/D conversion 2203.

Figure 23:
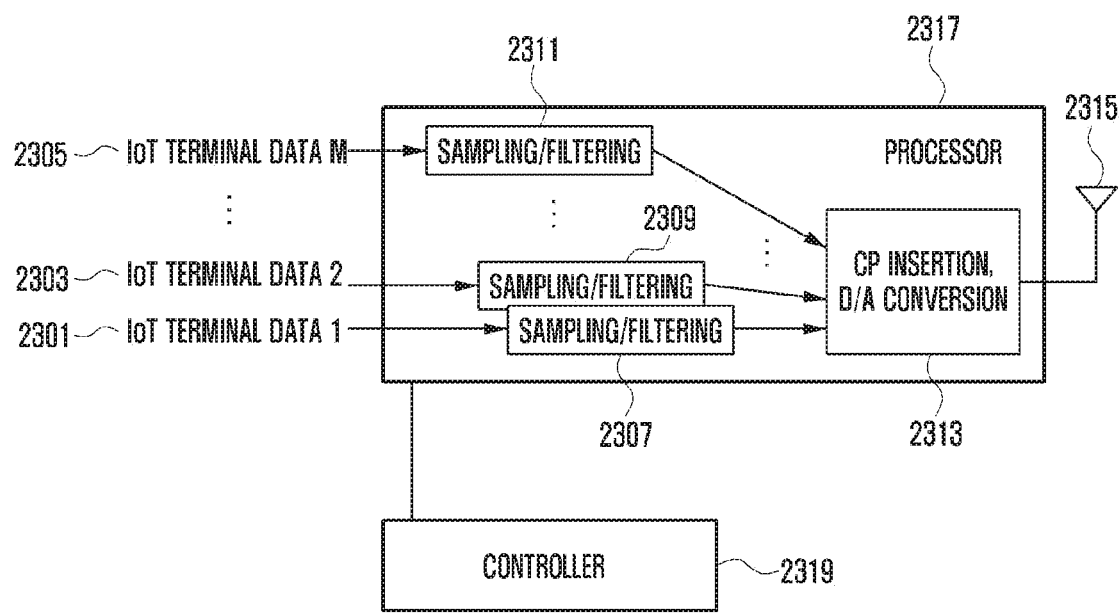
FIG. 23 is a block diagram of a transmitter for the IoT terminal to transmit signals using one or more subcarriers in the uplink.

FIG. 23 is a block diagram of a transmitter for the IoT terminal to transmit signals using one or more subcarriers in the uplink. Unlike the normal LTE terminal transmitter including an FFT/IFFT block, the IoT terminal transmitter shown in FIG. 23 does not include an FFT/IFFT block and transmits data on specific subcarriers through filtering using multiple filters 2307, 2309 and 2311.

The following equation represents filter coefficients of the filters 2307, 2309 and 2311 that can be used to transmit data 1 (2301), data 2 (2303), . . . , data M (2305) respectively on the $k_1, k_2, \ldots, k_M^{th}$ (M) subcarriers in the frequency range where the IoT terminal can transmit. When the filter length is $N_{samples}$, for n=0, 1, . . . , $N_{samples}$−1, the filter coefficient $w_{m,n}$ of the $m^{th}$ filter can be given by the following equation.

$$w_{m,n} = e^{j2\pi n(k_m - \frac{N}{2} + \frac{1}{2})/N_{samples}} \text{ for } k_m = 0, 1, \ldots, N-1 \quad \text{[Equation 6]}$$

In the above equation, N indicates the total number of subcarriers that can be configured for the IoT terminal to transmit. When the conversion rate of the D/A converter 2313 of the IoT terminal transmitter is $R_s$ (samples/second), $N_{samples}$ can be given by Equation 4 above.

In FIG. 23, separate filters may be inserted after D/A conversion 2313 and before signal transmission through the antenna 2315. Channel coding, scrambling, interleaving, and the like may be inserted before filtering (2307, 2309, 2311) of terminal data 1, data 2, . . . , data M (2301, 2303, 2305).

Figure 24:
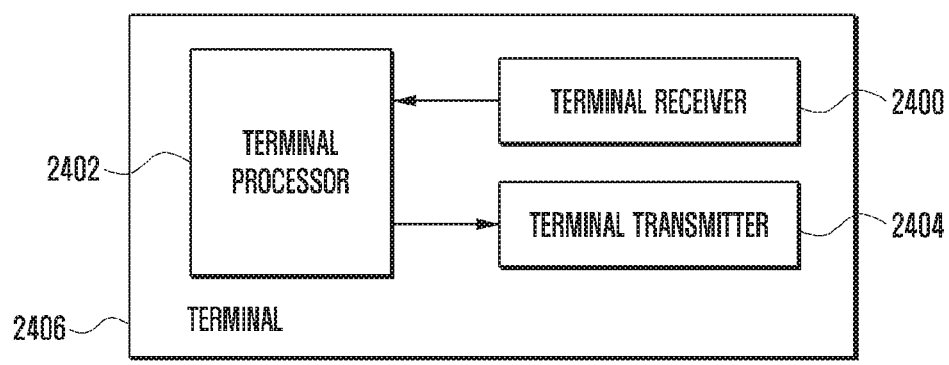
FIG. 24 is a block diagram of a terminal according to an embodiment of the present invention.
Figure 25:
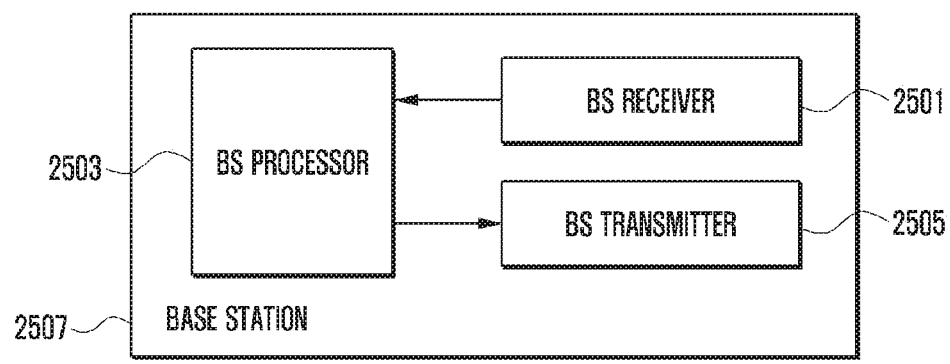
FIG. 25 is a block diagram of a base station according to an embodiment of the present invention.

The terminal may use the values obtained by multiplying an appropriate constant and the filter coefficient computed using Equation 5 and Equation 6 together. Configurations of a terminal and a base station for performing the above embodiments of the present invention are shown in FIGS. 24 and 25, respectively. The first to third embodiments describe operations of the base station and terminal for carrying out downlink and uplink signal transmission and reception of an IoT terminal and, to accomplish this, the receivers, processors, and transmitters of the base station and the terminal should operate according to the corresponding embodiments.

FIG. 24 is a block diagram of a terminal according to an embodiment of the present invention. As shown in FIG. 24, the terminal 2406 of the present invention may include a terminal receiver 2400, a terminal transmitter 2404, and a terminal processor 2402. In one embodiment, the terminal receiver 2400 and the terminal transmitter 2404 may be collectively referred to as a transceiver. The transceiver may transmit and receive a signal to and from the base station. The signal may include at least one of control information, data, and a pilot.

To this end, the transceiver may include a radio frequency (RF) transmitter for upconverting the frequency of a signal to be transmitted and amplifying the signal, and an RF receiver for low-noise amplifying a received signal and downconverting the frequency of the received signal. The transceiver may receive a signal through a radio channel and forward the received signal to the terminal processor 2402, and may receive a signal from the terminal processor 2402 and transmit the received signal through a radio channel.

The terminal processor 2402 may control a series of operations of the terminal so that the terminal can operate according to the embodiments of the present invention described above.

FIG. 25 is a block diagram of a base station according to an embodiment of the present invention. As shown in FIG. 25, the base station 2507 of the present invention may include a BS receiver 2501, a BS transmitter 2505, and a BS processor 2503.

In one embodiment, the BS receiver 2501 and the BS transmitter 2505 may be collectively referred to as a transceiver. The transceiver may transmit and receive a signal to and from the terminal. The signal may include at least one of control information, data, and a pilot.

To this end, the transceiver may include an RF transmitter for upconverting the frequency of a signal to be transmitted and amplifying the signal, and an RF receiver for low-noise amplifying a received signal and downconverting the frequency of the received signal. The transceiver may receive a signal through a radio channel and forward the received signal to the BS processor 2503, and may receive a signal from the BS processor 2503 and transmit the received signal through a radio channel.

The BS processor 2503 may control a series of operations of the base station so that the base station can operate according to the embodiments of the present invention described above.

For example, the BS processor 2503 may determine whether the terminal to be scheduled is a first type terminal or a second type terminal. If the terminal to be scheduled is a first type terminal, the BS processor 2503 may control generation of control information on the basis of control information for the first type terminal. In this case, the first type terminal may transmit and receive a signal through only one subcarrier.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention. In addition, the above-described embodiments can be carried out in combination with each other as needed. For example, the base station and the terminal may be configured to operate according to a combination of the second and third embodiments of the present invention.

The invention claimed is:

1. A method for a base station to transmit and receive signals, the method comprising:
    transmitting first information for configuring a resource block (RB) for a first type terminal through a higher layer signaling;
    identifying whether a terminal is the first type terminal;
    transmitting second information for allocating at least one subcarrier of the RB for the first type terminal in case that the terminal is the first type terminal, the RB being identified based on the first information; and
    communicating a signal with the terminal on a symbol of the allocated at least one subcarrier,
    wherein the second information is transmitted through the higher layer signaling or physical layer control signaling.

2. The method of claim 1, further comprising:
    transmitting third information for allocating an RB for a second type terminal through higher layer signaling in case that the terminal is not the first type terminal; and
    communicating a signal with the second type terminal on the allocated RB based on the third information.

3. The method of claim 1, wherein an index of the at least one subcarrier allocated to the first type terminal is determined according to an identifier of the first type terminal.

4. The method of claim 1, wherein the signal comprises at least one of data, a pilot signal, or control information, and
    wherein the signal is mapped to the symbol of the at least one subcarrier allocated to the first type terminal to which a signal for a second type terminal is not mapped.

5. A method for a terminal to transmit and receive signals, the method comprising:

receiving first information for configuring a resource block (RB) for a first type terminal from a base station through a higher layer signaling;

receiving second information for allocating at least one subcarrier of the RB for the first type terminal in case that the terminal is identified as the first type terminal by the base station, the RB being identified based on the first information; and communicating a signal with the base station on a symbol of the allocated at least one subcarrier, wherein the second information is received through the higher layer signaling or physical layer control signaling.

6. The method of claim 5, further comprising:

receiving third information for allocating an RB for a second type terminal from the base station through the higher layer signaling in case that the terminal is not the first type terminal; and communicating a signal with the base station on the allocated RB based on the third information.

7. The method of claim 5, wherein an index of the at least one subcarrier is determined according to an identifier of the first type terminal.

8. The method of claim 5, wherein the signal comprises at least one of data, a pilot signal, or control information, wherein the signal is mapped to the symbol of the at least one subcarrier allocated to the first type terminal to which a signal for a second type terminal is not mapped.

9. The method of claim 1, wherein the symbol of the allocated at least one subcarrier for communicating with the first type terminal is different from a symbol for communicating at least one of control information or a reference signal for a second type terminal.

10. The method of claim 5, wherein the symbol of the allocated at least one subcarrier for communicating with the base station is different from a symbol for communicating by the base station at least one of control information or a reference signal for a second type terminal.

11. A base station to transmit and receive signals, the base station comprising:

a transceiver; and a processor configured to:

control the transceiver to transmit first information for configuring a resource block (RB) for a first type terminal through a higher layer signaling, identify whether a terminal is the first type terminal, control the transceiver to transmit second information for allocating at least one subcarrier of the RB for the first type terminal in case that the terminal is the first type terminal, the RB being identified based on the first information, and control the transceiver to communicate a signal with the terminal on a symbol of the allocated at least one subcarrier, wherein the second information is transmitted through the higher layer signaling or physical layer control signaling.

12. The base station of claim 11, wherein the processor is further configured to control the transceiver to:

transmit third information for allocating an RB for a second type terminal through the higher layer signaling in case that the terminal is not the first type terminal, and communicate a signal with the second type terminal on the allocated RB based on the third information.

13. The base station of claim 11, wherein an index of the at least one subcarrier allocated to the first type terminal is determined according to an identifier of the first type terminal.

14. The base station of claim 11, wherein the signal comprises at least one of data, a pilot signal, or control information, and wherein the signal is mapped to the symbol of the at least one subcarrier allocated to the first type terminal to which a signal for a second type terminal is not mapped.

15. The base station of claim 11, wherein the symbol of the allocated at least one subcarrier for communicating with the first type terminal is different from a symbol for communicating at least one of control information or a reference signal for a second type terminal.

16. A terminal to transmit and receive signals, the terminal comprising:

a transceiver; and a processor configured to:

control the transceiver to receive first information for configuring a resource block (RB) for a first type terminal from a base station through a higher layer signaling;

control the transceiver to receive second information for allocating at least one subcarrier of the RB for the first type terminal in case that the terminal is identified as the first type terminal by the base station, the RB being identified based on the first information; and control the transceiver to communicate a signal with the base station on a symbol of the allocated at least one subcarrier, wherein the second information is received through the higher layer signaling or physical layer control signaling.

17. The terminal of claim 16, wherein the processor is further configured to control the transceiver to receive third information for allocating an RB for a second type terminal from the base station through the higher layer signaling in case that the terminal is not the first type terminal and communicate a signal with the base station on the allocated RB based on the third information.

18. The terminal of claim 16, wherein an index of the at least one subcarrier is determined according to an identifier of the first type terminal.

19. The terminal of claim 16, wherein the signal comprises at least one of data, a pilot signal, or control information, and wherein the signal is mapped to the symbol of the at least one subcarrier allocated to the first type terminal to which a signal for a second type terminal is not mapped.

20. The terminal of claim 16, wherein the symbol of the allocated at least one subcarrier for communicating with the base station is different from a symbol for communicating by the base station at least one of control information or a reference signal for a second type terminal.

21. The method of claim 1, wherein the first type terminal communicates with the base station using a narrow band in a wireless communication system comparing to a band for a second type terminal.

22. The method of claim 5, wherein the first type terminal communicates with the base station using a narrow band in a wireless communication system comparing to a band for a second type terminal.

23. The base station of claim 11, wherein the first type terminal communicates with the base station using a narrow band in a wireless communication system comparing to a band for a second type terminal.

24. The terminal of claim 16, wherein the first type terminal communicates with the base station using a narrow band in a wireless communication system comparing to a band for a second type terminal.

\* \* \* \* \*